(12) United States Patent
Mathiez

(10) Patent No.: US 11,291,288 B2
(45) Date of Patent: Apr. 5, 2022

(54) CONTAINER/APPLICATOR FOR A COSMETIC PRODUCT

(71) Applicant: CINQPATS, Limours (FR)

(72) Inventor: Jean-Louis Mathiez, Limours (FR)

(73) Assignee: CINQPATS, Limours (FR)

( * ) Notice: Subject to any disclaimer, the term of this patent is extended or adjusted under 35 U.S.C. 154(b) by 310 days.

(21) Appl. No.: 16/484,193

(22) PCT Filed: Feb. 7, 2018

(86) PCT No.: PCT/FR2018/050302
§ 371 (c)(1),
(2) Date: Aug. 7, 2019

(87) PCT Pub. No.: WO2018/146419
PCT Pub. Date: Aug. 16, 2018

(65) Prior Publication Data
US 2019/0350342 A1     Nov. 21, 2019

(30) Foreign Application Priority Data

Feb. 7, 2017 (FR) .................................... 1751015

(51) Int. Cl.
*B65D 1/09* (2006.01)
*B65D 51/32* (2006.01)
(Continued)

(52) U.S. Cl.
CPC ......... *A45D 40/267* (2013.01); *A45D 34/046* (2013.01); *B65D 1/095* (2013.01); *B65D 51/32* (2013.01); *B29C 2045/1601* (2013.01)

(58) Field of Classification Search
CPC .... A45D 34/04; A45D 34/042; A45D 34/043; A45D 34/045; A45D 34/046;
(Continued)

(56) References Cited

U.S. PATENT DOCUMENTS 5,054,946 A    10/1991 Morel
5,599,125 A    2/1997 Vasas et al.
(Continued)

FOREIGN PATENT DOCUMENTS

EP    0320363 A1    6/1989
EP    0792603 A1    9/1997
(Continued)

OTHER PUBLICATIONS

International Search Report, dated Jun. 6, 2018, from corresponding PCT application No. PCT/FR2018/050302.

*Primary Examiner* — David J Walczak
(74) *Attorney, Agent, or Firm* — Nixon & Vanderhye

(57) ABSTRACT

A container/applicator for content such as a cosmetic product has a cylindrical shape with an axis, that includes a reservoir having a wall, a closed end closed by a bottom and an open end with a free edge, a cap having a skirt and a top wall, and an applicator rod, a casing having a distal end and a proximal end, a squeegee, an interface, wherein the squeegee is a part separate from the casing and is housed in the casing, includes a protruding flange and a distal portion, is held by fixed rigid squeegee/reservoir-casing combination. The casing includes an open distal end, and a transverse step forming an inner shoulder.

28 Claims, 11 Drawing Sheets

(51) Int. Cl.
*A45D 40/26* (2006.01)
*A45D 34/04* (2006.01)
*B29C 45/16* (2006.01)

(58) Field of Classification Search
CPC .... A45D 34/047; A45D 40/26; A45D 40/262; A45D 40/264; A45D 40/265; A45D 40/267; A45D 40/268; A45D 2200/10; B65D 1/095; B65D 51/32; B29C 45/0081; B29C 45/16; B29C 2045/1601
USPC .................................. 401/121, 122, 126, 129
See application file for complete search history.

(56) References Cited

U.S. PATENT DOCUMENTS

| | | |
|---|---|---|
| 5,853,011 A | 12/1998 | Gueret |
| 6,572,296 B2 * | 6/2003 | Schrepf ................ A45D 34/045 132/218 |
| RE38,755 E | 7/2005 | Gueret |
| 7,223,034 B2 | 5/2007 | Hiyama |
| 7,467,906 B2 * | 12/2008 | Gueret ................ A45D 34/042 401/119 |
| 7,537,406 B2 * | 5/2009 | Kurek ................ A45D 40/265 401/124 |
| 8,210,761 B2 | 7/2012 | Bouix et al. |
| 2001/0052348 A1 | 12/2001 | Fischer |
| 2006/0102192 A1 | 5/2006 | Fischer |
| 2006/0225759 A1 | 10/2006 | Fukuda |
| 2012/0279876 A1 | 11/2012 | Weigel |
| 2013/0276817 A1 | 10/2013 | Holloway et al. |

FOREIGN PATENT DOCUMENTS

| | | |
|---|---|---|
| EP | 1425987 A1 | 6/2004 |
| EP | 2317888 B1 | 9/2014 |
| WO | 96/08180 | 3/1996 |

* cited by examiner

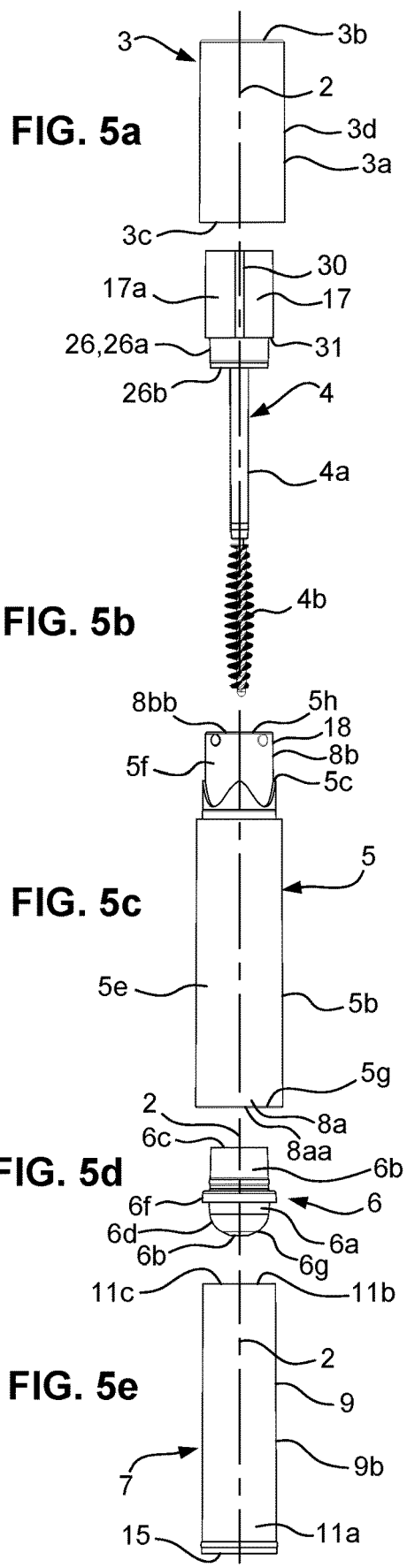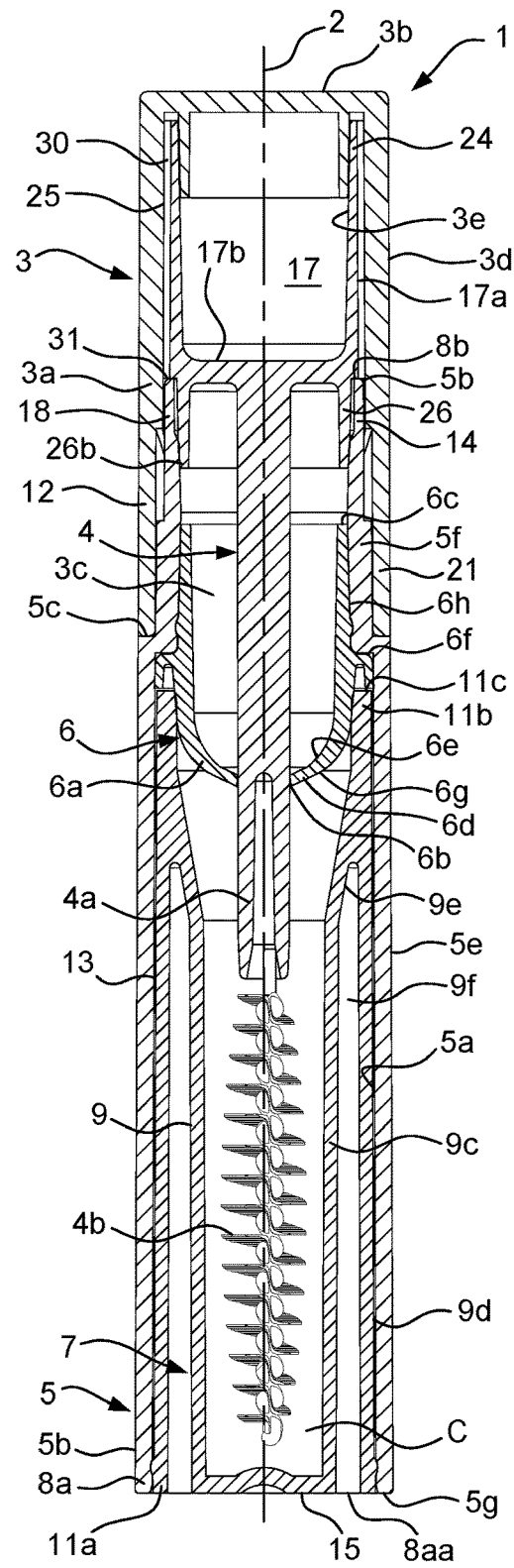

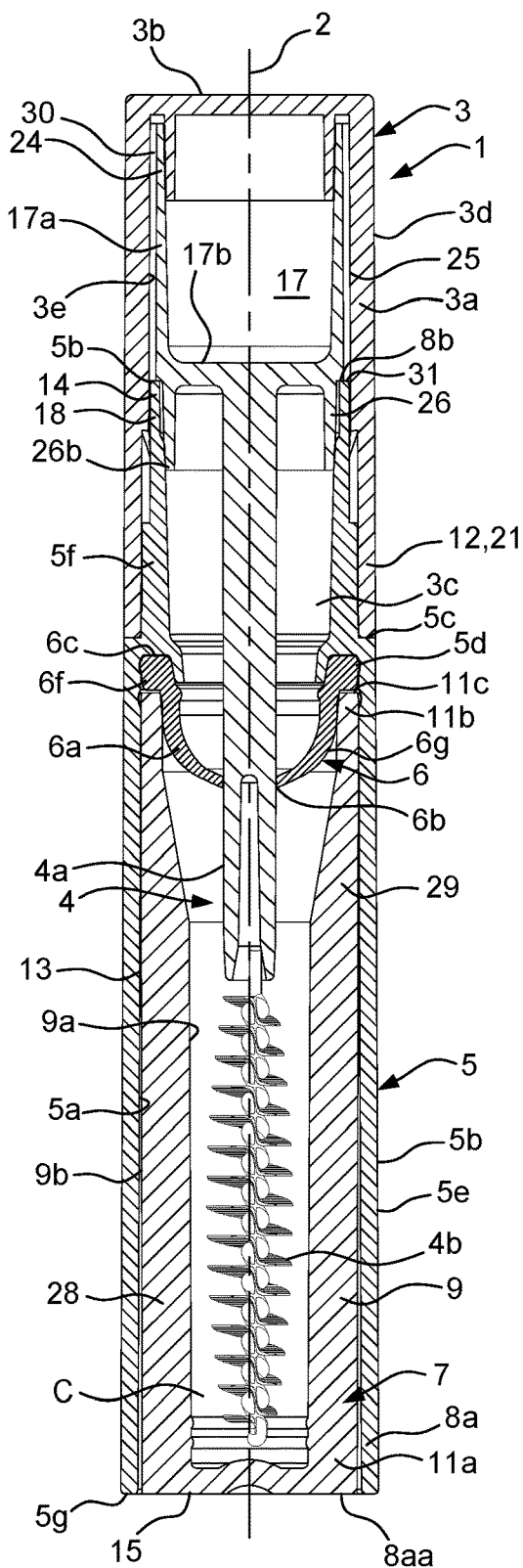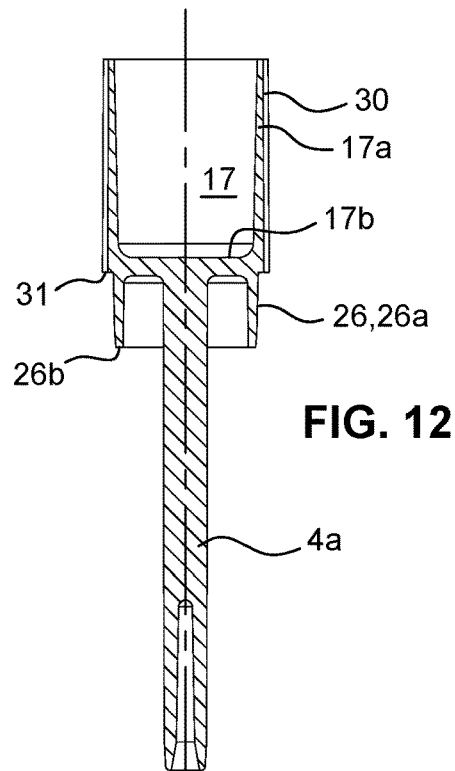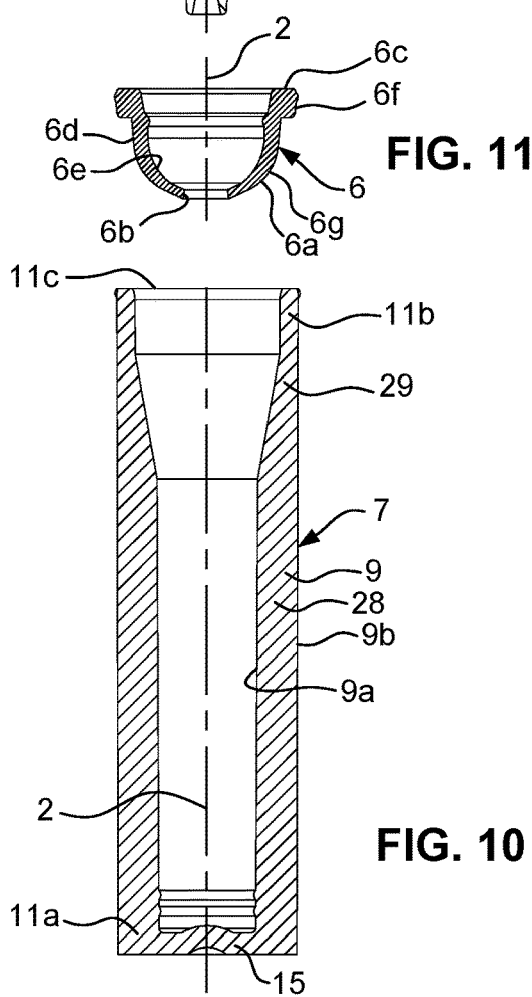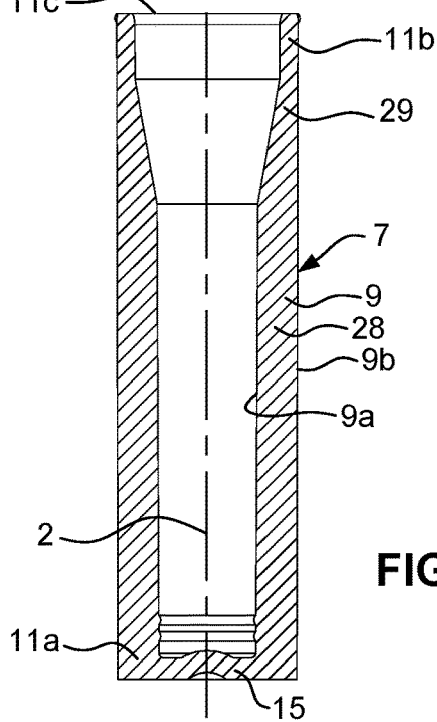

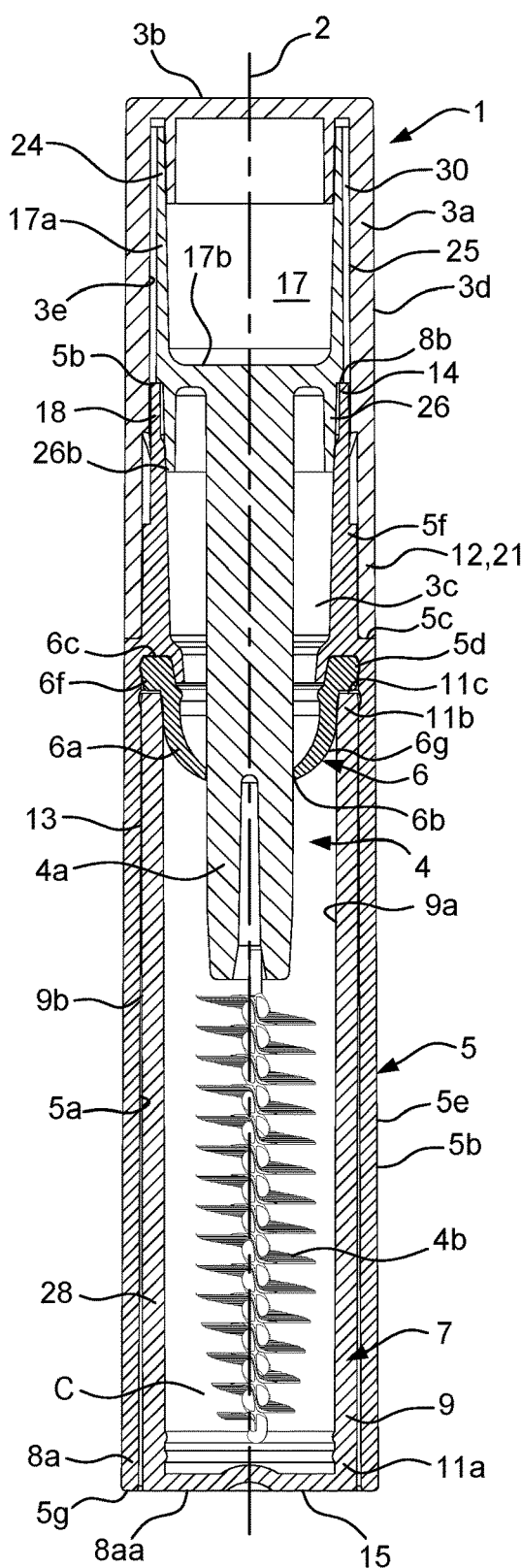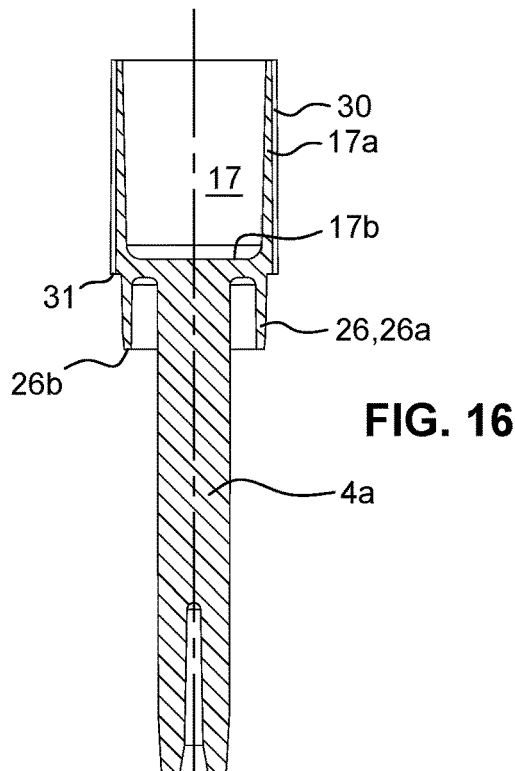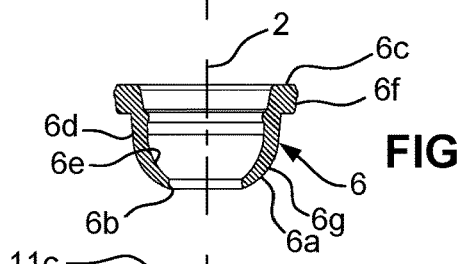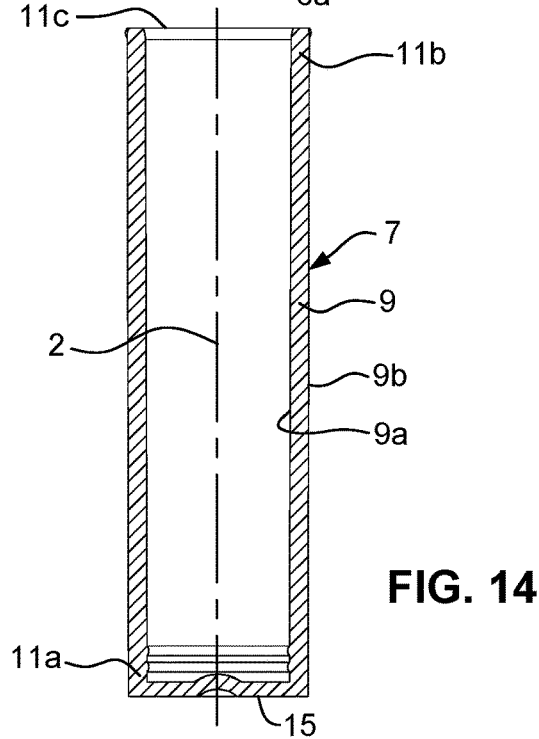
FIG. 13
FIG. 16
FIG. 15
FIG. 14

CONTAINER/APPLICATOR FOR A COSMETIC PRODUCT

BACKGROUND OF THE INVENTION

Field of the Invention

The invention relates to container/applicators for contents such as cosmetic products (mascara, eye-liner, lip-gloss, etc.) and more particularly to low-capacity (for a small amount of contents), small-sized container/applicators. For this purpose they must have a useful content volume around 1 ml to 20 ml, a total length of 60 mm to 200 mm, an axial reservoir length of 40 mm and 150 mm and an external diameter around 10 mm to 35 mm.

The invention relates, more specifically, to such a container/applicator, optionally assembled, closed or open, optionally filled with contents, a unitary cap/applicator/rod/squeegee/casing sub-assembly specially capable of and intended for forming, when assembled with a reservoir, such a container/applicator, a method for manufacturing such a container/applicator filled with contents, and tools for manufacturing such a container/applicator.

One possible application of the invention is a container/applicator of a cosmetic product sample made available to potential buyers to allow them to test the contents once or a few times (e.g. 2 to 5 times). In the case of such an application, it may be necessary to obtain short runs of container/applicators at reasonable economic conditions.

Description of the Related Art

These features-low capacity, small size, sample, single use or a small number of uses, possibility of short runs-impose many requirements. The container/applicator must be straightforward and inexpensive, including for short runs. It must not contain any parts that are complex or require a significant amount of material or require a substantial size. It must be able to be aesthetically pleasing. It must be able to be manufactured easily, quickly, at high speed and at reduced cost, even for short runs. It must be able to be manufactured, even during the step that includes filling and final combination, without its components being damaged. It must be able to be manufactured without requiring complex and expensive tools, such as sliding moulds. It must be easy to use, without requiring complicated manipulations. Finally, the seal must be sufficiently effective, safe and carried out without difficulty.

A known conventional container/applicator has a generally elongate cylindrical shape along an axis and comprises a plurality of functional or structural means combined or assembled with one another:
- a rigid reservoir for the contents, having a peripheral axial wall with a distal end closed by a bottom and an open proximal end,
- a removable closure cap having a peripheral wall forming a skirt and a top wall,
- an applicator with a combining rod—made as one part or as a plurality of parts combined together in a fixed rigid manner—, comprising an applicator and a portion for combining with the cap in a fixed rigid manner so as to be able to form a cap/applicator/rod unit,
- and a squeegee with two open edges, a distal edge with a smaller opening and a proximal edge with a larger opening.

The term "distal" should be understood to describe a means that is far from or farthest from the top wall of the cap (which forms one end of the container/applicator) and the term "proximal" should be understood to describe a means that is close to or closest to this top wall.

Such a container/applicator also comprises interface means for sealing and combination. The seal is typically produced by axial clamping of two parts or between the applicator rod and the squeegee. Most often, the squeegee is flexible (see US 2013/0276817, EP 07 92603, EP 07 30416 and EP 1 425 987) and, less frequently, it is essentially rigid (see EP 2 317 888). Flexible squeegees are best suited to their function, unlike essentially rigid squeegees, which have limited efficiency and can damage the applicators (see U.S. Pat. No. 5,599,125).

Such a container/applicator can be the subject of a number of embodiments, in particular that of the specific type of the invention, in which the container/applicator has low-capacity and small size and comprises five distinct parts: reservoir, cap, applicator with combining rod, casing and flexible squeegee.

Document US 2012/0279876 describes a container/applicator with a flexible squeegee, but which is not of the type of the invention insofar as a peripheral locking ring (which can be described as a bushing) is not combined with the rest of the container/applicator, in this case the reservoir, in a fixed rigid manner, and instead is capable of sliding axially. The cap is partially made of injection-moulded plastic and partially of metal and is provided with resilient locking hooks. The reservoir comprises, on its peripheral axial face, a shoulder with which the hooks can engage, inside of which is mounted the squeegee which has an annular flange protruding from the open proximal end of the reservoir and which performs both the wringing function and the reservoir/cap sealing function by pressing axially. This container/applicator comprises the aforementioned peripheral locking ring, which has a short axial length compared with that of the reservoir, open at both ends, slidably (not fixed) mounted relative to the reservoir and the cap when it is mounted on the reservoir. The common axial length of the reservoir and the locking ring is around 25% shorter than that of the reservoir. This locking ring is intended for locking the hooks to prevent opening of the container/applicator. During closing and opening, the locking ring slides axially in one direction or the other so as to release or, conversely, to lock the hooks. Such a container/applicator is complex, having resilient hooks and a slidably mounted locking ring. Its diameter is large, because of the hooks and the locking ring. The squeegee is thus made to perform a function other than its wringing function, namely a sealing function. This is not desirable. Such a container/applicator therefore does not meet the requirements imposed by the aforementioned features.

EP 0 320 363 discloses a container/applicator with an essentially rigid squeegee, which is also not of the same type as that of the invention in that it is formed by three separate parts of injected polypropylene assembled together: a cap/applicator/rod, an inner reservoir and a casing/squeegee with an outer portion having a larger diameter, a first inner portion having a smaller diameter forming a combining thread, and a second inner portion having a smaller diameter forming a squeegee that is rigid and made of polypropylene, a transverse step for connection between these parts, having an open distal end located towards the distal end of the reservoir, an open proximal end located in the cap, and finally the smaller opening of the squeegee. The common axial length of the reservoir and the casing is around 85%. The reservoir is arranged in the squeegee-casing with a large radial clearance over a substantial portion of the common axial length of the reservoir and the casing, with the exception of the two end portions of the reservoir which are held fixed rigid contact with the squeegee-casing. The means for combining the cap/applicator/rod and the casing/squeegee comprise matching screw threads on the cap and on the casing/squeegee, the opening and closing being carried out by rotation. The sealing means comprise sealing means between the casing/squeegee and the cap combined with sealing means between the container and the casing/squeegee and sealing means between the squeegee and the rod of the cap/applicator/rod. The sealing means between the casing/squeegee and the cap result from axial clamping of the mated surfaces of the casing/squeegee adjacent to its screw thread and the cap adjacent to its screw thread, this axial clamping being obtained by screwing. The sealing means between the container and the casing/squeegee result from the sealed assembly of the container and the casing/squeegee. As for the sealing means between the squeegee and the rod of the cap/applicator/rod, they result from the sealed bearing of the squeegee on the rod. Such a container/applicator has several drawbacks and limitations. The choice to reduce the number of parts to three is a factor that greatly limits the modularity. The moulds for producing the three parts are complicated and their productivity is low, and manufacturing is rather slow. This leads to high production costs. As regards the mould of the cap/applicator/rod, it is difficult to cool, especially in the case of rods that have large diameters, and it must be equipped with a motorised unscrewing system for extracting the inner thread, which increases the cost of the mould and slows the production rate. As regards the mould of the casing/squeegee, it must be equipped with a movable slide system in order to remove the thread from the mould, which increases the cost of the mould and slows the production rate. More generally, the design of the container/applicator is such that a specific mould is required for every useful volume, and thus for every corresponding container/applicator size. This is expensive and very restrictive in terms of changing the mould, due to the weight of the mould. This limits the flexibility and increases the costs, while the ranges of volumes and sizes are limited and short runs are not foreseeable. By the very fact of its design, the appearance of the container/applicator surely lacks the required visual quality, for example due to cavities on the top of the cap due to the shrinkage of the rod upon cooling, a visible and unsightly injection point on the cap, which is important, however, to be able to produce the rod, flow lines on the cap at the inner thread, flow lines and cavities on the casing/squeegee, and the presence of a space with an annular channel under the reservoir. The seal of the container/applicator is unsatisfactory, firstly because the mating surfaces in contact intended to provide the seal are adjacent with the screw threads of the casing/squeegee and the cap, and secondly because it is known that the bearing of the squeegee on the rod also does not allow effective sealing, and furthermore, it is sometimes recommended for there to be a certain radial clearance between the squeegee and the rod. The presence of the threads requires sufficient material thicknesses of the cap and the casing/squeegee and has the effect, all other things being equal, of reducing the diameter of the opening available to the applicator, thus limiting the maximum diameter of the applicators that can be used. Finally, because it is formed integrally with the casing, the squeegee is essentially rigid, as is the casing, with the aforementioned inherent drawbacks.

Documents US2001/0052348 and US2006/0225759 each describe an applicator for mascara samples, which also includes three parts and which has the same drawbacks and limitations.

US 2006/0102192 describes a container/applicator with flexible squeegee, which is of the specific type of the invention. This container/applicator, with a capacity of between 1 ml and 30 ml, comprises a blow-moulded plastic reservoir, a cap, an applicator with a combining rod, an entirely external casing comprising a distal end closed by a bottom, located towards the distal end of the reservoir, and an open proximal end, located on the side of the cap and the open proximal end of the reservoir, and finally a separate, added, flexible squeegee. The reservoir is half-internal and half-external, being arranged inside the casing with a radial clearance of 0.1 mm over the entire axial length, while its open proximal end, of constricted shape, protrudes axially from the proximal end of the casing. It should be understood that the expression "half . . . half . . . " expresses an intermediate state without any geometric precision. The common axial length of the reservoir and the casing is therefore 100%. The means for rigid combination of the reservoir and the outer casing comprise, towards the distal end of the reservoir and the distal end of the casing, a radial retention provided by the engagement of an axial stud provided on the inner face of the bottom of the casing and a cavity provided on the opposite face of the bottom of the reservoir and, on the side of the open proximal end of the reservoir and the open proximal end of the casing, an axial retention provided by the engagement of an annular projection and an annular groove provided on the reservoir and the casing. The squeegee comprises an axial and radial annular flange protruding from the open proximal end of the reservoir, which is accessible to the user once the cap has been removed. The means for rigid combination of the squeegee and the remaining portion of the container/applicator comprise retention via the insertion of the squeegee by force into the open proximal end of the reservoir. The means for removable rigid combination of the cap and the remaining portion of the container/applicator (in this case the reservoir) comprise matching screw threads on the cap and the reservoir, the opening and closing being carried out by rotation. The sealing means between the cap and the remaining portion of the container/applicator are obtained by axial clamping of the annular flange of the squeegee inserted between the edge of the proximal opening of the reservoir and an inner transverse face of the portion for fixed rigid combination of the applicator with the rod for combining with the cap. In this container/applicator, the casing, made of glass, has a purely decorative function, namely to give the visual impression of a thick reservoir wall.

In one embodiment, the conventional manufacture of such a container/applicator consists of:
a/ producing a cap/applicator/rod assembly, by combining the cap and the applicator in a fixed rigid manner with the combining rod by means of the combining portion,
b/ producing the reservoir and, in the case of document US 2006/0102192, the casing,
c/ filling the reservoir with contents, then combining a squeegee in a fixed rigid manner in the proximal end of the reservoir, and
d/ inserting the applicator and the rod into the squeegee, then putting the cap in place and thus closing the container/applicator.

Most often, steps a/ and b/ are carried out at a plastic-processing site, and the produced parts are sent to a remote packaging site, where steps c/ and d/ are carried out.

With this production method, step d/ becomes problematic, because the insertion of the applicator and the rod into the squeegee is difficult and slow and can lead to a loss of alignment between the rod and the applicator, which does not allow mounting in the squeegee, limits the production rate and generates waste.

In another embodiment, step c/ is reversed, so that the squeegee is first combined in a fixed rigid manner with the proximal end of the empty reservoir, and the reservoir is then filled with contents by means of an injection nozzle that enters the squeegee. However, it has been observed that the filling operation can only be performed at a limited rate, which thus does not solve the aforementioned problems.

A container/applicator according to document US 2006/0102192 and its production do not meet the aforementioned requirements. Manufacturing has the problems stated above. Sealing of the annular flange of the squeegee by axial compression is not satisfactory. The same applies to the screw threads on the cap and the reservoir. In addition, the structure of the container/applicator requires complex, expensive tools, such as sliding moulds. Additionally, the production of a glass casing is inappropriate for a sample, notwithstanding the dimensional tolerance problems.

The problem underlying the invention is therefore that of overcoming the limitations, drawbacks and problems of the aforementioned container/applicators and their manufacturing processes, so as to best meet the requirements imposed by the aforementioned features: low capacity, small size, sample, single use or small number of uses, possibility of short runs. In particular, this requires exceeding the limits and solving the manufacturing problems at the packaging site remote from the plastic-processing site, which receives the parts manufactured at the latter site, as well as limiting the rate and the consequences of the loss of alignment between the rod and the applicator. Furthermore, it requires providing an effective, safe seal of the container/applicator that is easily achieved.

Starting with a container/applicator such as that of document EP 0 320 363, it also requires, in particular:
- avoiding a one-piece rigid part forming the casing and the squeegee and an essentially rigid squeegee,
- avoiding a one-piece cap/applicator/rod part, with the inherent limitations,
- doing away with means for removable rigid combination between the cap and the remaining portion of the container/applicator, such as screw threads,
- obtaining an effective, safe seal, that is achieved more easily.

Starting with a container/applicator such as that of document US 2006/0102192, it also requires, in particular:
- doing away with means for removable rigid combination between the cap and the remaining portion of the container/applicator, such as screw threads,
- avoiding a seal between the cap and the remaining portion of the container/applicator by axial clamping of an annular flange of the squeegee and, more generally, ensuring an effective, safe seal of the container/applicator that is easily achieved.

Starting with a container/applicator such as that of document US 2012/0279876, it also requires, in particular, avoiding the presence of resilient hooks and a sliding peripheral ring.

This is the field of the invention, this is the state of the art and these are the technical problems which the invention aims to solve.

BRIEF SUMMARY OF THE INVENTION

The following is a disclosure of the invention.

According to a first aspect, the invention relates to a container/applicator in the assembled state, closed and filled with contents such as a cosmetic product, specifically a mascara, an eye-liner product or a lip-gloss product, having a generally elongate cylindrical shape along its axis and which comprises as means:
- a reservoir for receiving contents having a peripheral axial wall, with a distal end closed by a bottom and an open proximal end with a proximal edge,
- a removable closure cap, having a peripheral axial skirt and a top wall, and an applicator/rod, arranged so that the cap and the applicator/rod form a unitary cap/applicator/rod,
- a casing formed by a peripheral axial wall, having a distal end and an open proximal end, the reservoir and the casing having a common axial length of the reservoir and the casing,
- an annular squeegee having an open distal edge forming a smaller opening and an open proximal edge forming a larger opening,
- interface means comprising means for fixed rigid combination of the reservoir and the casing, means for removable rigid combination of the cap/applicator/rod and the remaining portion of the container/applicator means, and sealing means.

This container/applicator is such that the squeegee is a part separate from the casing, housed completely in the casing, which includes a proximal portion similar to a protruding centrifugal flange and a distal portion similar to a truncated cone or a spherical segment, which is held by means for fixed rigid combination of the squeegee with the reservoir and the casing. The casing has an open distal end, and a transverse step forming an inner shoulder, and its configuration is suited so that, during the manufacture of the container/applicator, on the one hand, the squeegee can be inserted, starting with its proximal edge, into the open distal end of the casing, then guided to slide axially into the casing in the proximal direction, and on the other hand, the reservoir filled with contents can be inserted, starting with its proximal edge, into the open distal end of the casing, and then guided to slide axially into the casing in the proximal direction. The proximal edge of the flange of the squeegee is adjacent to the inner shoulder. The proximal edge of the reservoir is adjacent to the distal edge of the flange. The flange is in peripheral contact with the inner face of the casing. The proximal end of the reservoir is housed completely in the casing and matches the inner face of the casing. The distal portion of the squeegee and the proximal end of the reservoir are in peripheral contact. The squeegee is flexible.

The means for fixed rigid combination of the squeegee with the reservoir and the casing involve radial clamping of the squeegee on the proximal end of the reservoir and on the casing.

The container/applicator comprises means for temporary fixed rigid combination of the squeegee and the casing while, during manufacture, the reservoir is still not combined in a fixed rigid manner with and inside the casing.

The step comprises an inner return directed axially in the distal direction, so as to form an open annular groove in the distal direction, in which the flange of the squeegee is housed. The casing includes two portions extending axially, joined by the step: an outer distal portion having a larger diameter and an inner proximal portion having a smaller diameter.

The means for removable rigid combination of the cap/applicator/rod and the remaining portion of the container/applicator are between the cap/applicator/rod and the casing, of the threadless type and held by peripheral surface contact of the mated surfaces of the cap/applicator/rod and the proximal portion of the casing.

The cap and the applicator/rod are two separate parts; the applicator/rod can itself be the fixed rigid assembly of several components, with means for fixed rigid combination of the cap and the applicator/rod.

The proximal end of the casing is inserted between the face of larger diameter of a neck of the applicator/rod and the opposite inner face of the cap.

The means for fixed rigid combination of the reservoir and the casing comprise radial clamping of mated surfaces in contact of the face of larger diameter of the reservoir and the inner face of the distal portion of the casing. According to one embodiment, these combination means comprise an axial retention made with a boss/recess combination of the face of larger diameter of the reservoir and the inner face of the distal portion of the casing.

According to one embodiment, the means for fixed rigid combination of the reservoir and the casing comprise, on a proximal portion with clamping of the common axial length of the reservoir and the casing adjacent to the proximal edge of the reservoir and the inner shoulder, radial clamping of mated surfaces in contact of the face of larger diameter of the reservoir and the inner face of the distal portion of the casing, and wherein the walls of the reservoir and the casing have a clearance taper so that the face of larger diameter of the reservoir and the inner face of the casing have a radial clearance between them on a distal portion with clearance of the common axial length of the reservoir and the casing, the common axial length comprising the proximal portion with clamping and the distal portion with clearance. The boss/recess combination is located axially in the proximal portion with clamping.

According to another embodiment, the means for fixed rigid combination of the reservoir and the casing comprise, over at least substantially the entire common axial length of the reservoir and the casing, radial clamping, with axial pushing, of mated surfaces in contact of the face of larger diameter of the reservoir and the inner face of the distal portion of the casing. The boss/recess combination is located axially towards the bottom of the reservoir in the distal portion of the common axial length of the reservoir and the casing.

The sealing means comprise a peripheral radial clamping, sealing the squeegee on the proximal end of the reservoir and on the casing.

The sealing means comprise a peripheral radial clamping, sealing the flange of the squeegee with the inner face of the casing, and the distal portion of the squeegee with the face of smaller diameter of the proximal end of the reservoir.

The sealing means comprise a peripheral radial clamping, sealing the squeegee on the face of the recess of the groove of the step of the casing, specifically in two peripheral zones facing one another.

According to one embodiment, in a pair of zones of the face of a squeegee, reservoir or casing, with sealing peripheral radial clamping, at least one of the two zones of the pair has a small taper for sealing peripheral radial clamping following an axial push during manufacture.

According to one feature, the sealing means also comprise radial clamping, sealing the cap/applicator/rod on the proximal end of the casing, by axial pushing during the closing of the container/applicator, for example between the face of larger diameter of a flange of the applicator/rod and the face of smaller diameter of the proximal end of the casing, so that the neck enters the casing.

According to the embodiments, the bottom of the reservoir is positioned in a coplanar fashion relative to the distal edge of the casing, so that the bottom closes the distal opening of the casing, the common axial length of the reservoir and the casing matching the axial length of the reservoir and matching the axial length of the distal portion of the casing, or being a little shorter or a little longer.

According to one possible embodiment, the reservoir comprises a single peripheral wall that provides the function of bounding the space that receives the contents and participates in the function of fixed rigid combination of the reservoir and the casing. According to another embodiment, the reservoir comprises, combined in a fixed rigid manner, a first peripheral axial wall of smaller diameter with which the bottom is combined, which participates in the function of bounding the space that receives the contents, a second peripheral axial wall, of larger diameter, which participates in the function of fixed rigid attachment of the reservoir with the casing, and a peripheral axial wall connecting the walls with smaller and larger diameter arranged radially facing one another and combined with one another in a fixed rigid manner.

The cap/applicator/rod and the casing can comprise means for relative angular positioning and/or means for assisting with the opening of the container/applicator, such as one or more bump/recess assemblies formed on the applicator cap and on the casing, respectively, actively engaging for relative angular positioning and/or for assisting with the opening of the container/applicator.

The container/applicator includes five distinct parts, assembled with one another, and combination and sealing interface means, namely the reservoir, the cap, the applicator/rod, the casing, and the squeegee.

According to a second aspect, the invention relates to a unitary cap/applicator/rod/squeegee/casing sub-assembly specially capable of and intended for forming, when assembled in a fixed rigid manner with a reservoir filled with contents, via interface means for fixed rigid combination and sealing means, a container/applicator assembled, closed and filled with contents as previously described, said sub-assembly having a generally elongate cylindrical shape along its axis and being configured so that it can be interlocked and nested with the reservoir:

which includes as means:
  a cap, having a peripheral axial skirt and a top wall, and an applicator/rod, arranged so that the cap and the applicator/rod form a unitary cap/applicator/rod,
  a casing comprising a peripheral axial wall, an open distal end, an open proximal end and a transverse step towards the axis forming an inner shoulder, and having a configuration adapted so that, during manufacture, on the one hand, the squeegee can be inserted, starting with its proximal edge, into the open distal end of the casing, then guided to slide axially into the casing in the proximal direction, and on the other hand, the reservoir can be inserted into the open distal end of the casing, and then guided to slide axially into the casing in the proximal direction,
  an annular squeegee having an open distal edge forming a smaller opening and an open proximal edge forming a larger opening, which is a part separate from the casing and housed completely therein, which has a proximal portion similar to a centrifugal protruding flange and a distal portion similar to a truncated cone or a spherical segment, with the proximal edge of the flange adjacent to the shoulder, the flange being in peripheral contact with the inner face of the casing, interface means comprising means for fixed rigid combination of the cap/applicator/rod and the casing and means for removable rigid combination of the squeegee and the casing, and sealing means, which is manufactured as such a unitary sub-assembly and which can be stored, transported, handled and assembled with said container filled with contents so as to obtain a container/applicator in the assembled state, closed and filled with contents.

Such a unitary cap/applicator/rod/squeegee/casing sub-assembly can be produced according to one or another embodiment or may have one or another feature previously described for the container/applicator.

According to a third aspect, the invention relates to a method for manufacturing a container/applicator in the assembled state, closed and filled with contents as previously described, wherein:

the container/applicator comprises, separately, a unitary cap/applicator/rod/squeegee/casing sub-assembly, a reservoir for receiving contents that is empty of contents, and contents, the unitary cap/applicator/rod-casing/squeegee sub-assembly and the reservoir for receiving contents being configured so that they can be combined in a fixed rigid manner by being interlocked and nested, then, the reservoir is filled with the contents via the opening of its proximal end, then, the unitary cap/applicator/rod/squeegee/casing sub-assembly is interlocked, nested and combined with the reservoir thus filled with contents, so as to obtain the container/applicator in the assembled state, closed and filled with contents.

According to one embodiment, in order to obtain the unitary cap/applicator/rod/squeegee/casing sub-assembly:

a cap and an applicator/rod, a casing, and a squeegee are provided separately.

then the cap, the applicator/rod, the casing and the squeegee are interlocked, nested and combined in a fixed rigid manner by axial sliding and axial pushing for combination, so as to obtain the unitary cap/applicator/rod/squeegee/casing sub-assembly, namely the cap and the applicator/rod being interlocked, nested and combined, the squeegee and the casing being interlocked, nested and combined, and the cap and the applicator/rod as well as the casing and the squeegee being interlocked, nested and combined.

According to the case, the cap, the applicator/rod, the casing and the squeegee are interlocked, nested and combined in a fixed rigid manner by axial sliding and axial pushing for combination, either in a single common interlocking, nesting and combination operation or in several consecutive operations, if need be by one or more interlocking, nesting and combination operations for a sub-sub-assembly.

According to one feature, the squeegee is inserted, starting with its proximal edge, into the casing, then guided to slide axially into the casing in the proximal direction until being combined in a temporary fixed rigid manner until assembly and rigid combination of the reservoir.

According to one feature, the reservoir is inserted, starting with its proximal edge, into the casing, then guided to slide axially into the casing in the proximal direction until it bears on the squeegee and reciprocal axial pushing for rigid combination is provided.

According to one feature of the method:

the unitary cap/applicator/rod/squeegee/casing sub-assembly and the reservoir for receiving contents, empty of contents, are provided at one or more plastic-processing sites, the unitary cap/applicator/rod/squeegee/casing sub-assembly and the reservoir for receiving contents, empty of contents, are transported to a packaging site that can be remote from the plastic-processing site or sites, and, at the packaging site, the reservoir is filled with the contents and the unitary cap/applicator/rod/squeegee/casing sub-assembly is interlocked, nested and combined in a fixed rigid manner with the reservoir thus filled with contents.

According to a fourth aspect, the invention relates to a tool for manufacturing by injection-moulding of plastic material, capable of and intended for implementing the manufacturing method as previously described, in which at least one and in particular all the moulds for manufacturing a cap, for manufacturing an applicator/rod or at least a rod, for manufacturing a casing, for manufacturing a squeegee, and for manufacturing a reservoir are moulds without slides.

According to one embodiment, the manufacturing tool for producing a range of container/applicators having a given overall external length, a given overall external diameter, and a capacity chosen from a range of capacities, includes a single mould for manufacturing a cap, a single mould for manufacturing an applicator/rod or at least a rod, a single mould for manufacturing a casing, a single mould for manufacturing a squeegee, a single mould for manufacturing a reservoir, a range of pins, inserts or the like, capable of engaging with the single mould for manufacturing an applicator/rod or at least a rod, so as to be able to manufacture, using said mould, applicator/rod assemblies or at least rods of a range of sizes (shape, diameter, length) corresponding to the range of capacities of the container/applicators and to the application function, a range of pins, inserts or the like, capable of engaging with the single mould for manufacturing the squeegee, so as to be able to manufacture, using said mould, squeegees of a range of sizes corresponding to the range of applicator/rods, a range of pins, inserts or the like, capable of engaging with the single mould for manufacturing the reservoir, so as to be able to manufacture, using said mould, reservoirs of a range of sizes corresponding to the range of capacities of the container/applicators.

BRIEF DESCRIPTION OF THE DRAWINGS

The figures of the drawings are briefly described below:

FIGS. 5a, 5b, 5c, 5d and 5e are five front views of the five distinct parts that make up the container/applicator of the first embodiment, prior to assembly, namely, from top to bottom, the cap (FIG. 5a), the applicator with combining rod (FIG. 5b), the peripheral casing (FIG. 5c), the squeegee (FIG. 5d) and the reservoir (FIG. 5e). These five figures are presented with a common vertical axis, which is the axis of the container/applicator as shown in FIG. 4, their arrangement (from top to bottom and with regard to the direction) reflecting the arrangement of the five parts prior to assembly. To manufacture the container/applicator in the assembled state, closed and filled with contents, a unitary cap/applicator/rod/squeegee/casing sub-assembly formed by assembling, by axial sliding, the cap of FIG. 5a, the applicator with combining rod of FIG. 5b, the peripheral casing of FIG. 5c and the squeegee of FIG. 5d, as well as the reservoir of FIG. 5e, and finally the contents are provided separately; then the reservoir is filled with the contents, and then the unitary cap/applicator/rod/squeegee/casing sub-assembly and the reservoir thus filled with contents are interlocked, nested and rigidly combined by axial sliding.

FIG. 6 is a view similar to FIG. 4 of a container/applicator according to a second embodiment, in which the reservoir comprises, forming a unitary assembly, as a single piece, a first peripheral axial wall and a second peripheral axial wall, arranged radially, facing one another concentrically and combined with one another in a fixed rigid manner. In this embodiment, the common axial length of the reservoir and the casing matches that of the reservoir and that of the distal portion of the casing.

FIG. 9 is an axial cross-section view of a container/applicator according to a third embodiment, having small capacity—in this case 1 ml—belonging to the range of container/applicators having a given overall external length, a given overall external diameter, and a capacity selected from a range of capacities. In this embodiment, the common axial length of the reservoir and the casing matches that of the reservoir and that of the distal portion of the casing.

FIG. 10 is an axial cross-section view of the reservoir of the third embodiment of FIG. 9.

FIG. 11 is an axial cross-section view of the squeegee of the third embodiment of FIG. 9.

FIG. 12 is an axial cross-section view of the rod of the applicator with the combining rod of the third embodiment of FIG. 9, the applicator member itself not being shown.

FIG. 13 is an axial cross-section view of a container/applicator according to a fourth embodiment, having greater capacity—in this case 2 ml—belonging to the range of container/applicators having a given overall external length, a given overall external diameter, and a capacity selected from a range of capacities. In this embodiment, the common axial length of the reservoir and the casing matches that of the reservoir and that of the distal portion of the casing.

FIG. 14 is an axial cross-section view of the reservoir of the fourth embodiment of FIG. 13.

FIG. 15 is an axial cross-section view of the squeegee of the fourth embodiment of FIG. 13.

FIG. 16 is an axial cross-section view of the rod of the applicator with the combining rod of the fourth embodiment of FIG. 13, the applicator member itself not being shown.

DETAILED DESCRIPTION OF THE PREFERRED EMBODIMENTS

Hereinafter is a detailed description of several embodiments of the invention, with examples and references to the drawings.

A container/applicator 1 according to the invention is suitable and intended for contents C such as a cosmetic product, specifically a mascara, an eye-liner product or a lip-gloss product, etc. Such contents C are more or less fluid or pasty and, when they are in the container/applicator 1 forming a mass, it is possible to extract a fraction of them by means of an applicator 4b which is part of the container/applicator 1, in order to be applied to the skin at the desired location, such as the eyes or the lips. This is the context in which the terms "container/applicators" and "cosmetic product" should be understood. The features "cosmetic product", "mascara, eye-liner, lip-gloss", "more or less fluid or pasty" have no limiting effect, since the contents C have similar or identical properties of consistency and grip to those of such a cosmetic product. For example, the contents C could be a drug, a healthcare product or a decorative or coating product. The expression "container/applicator" refers to the fact that it performs two functions: it contains the contents C while also allowing them to be applied.

In one application, the container/applicator 1 has low capacity (and thus a small amount of contents C) and a small size. Therefore, it should comprise a useful content volume around 1 ml to 20 ml, a total length of 60 mm to 200 mm, an axial reservoir length of 40 mm and 150 mm and an external diameter around 10 mm to 35 mm.

Figure 3:
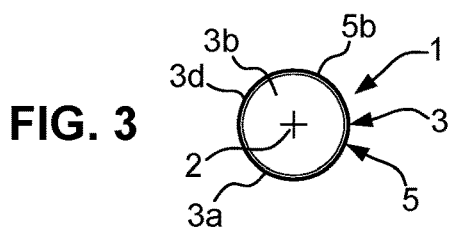

The container/applicator 1 in its assembled state, closed and filled with contents C (FIGS. 1, 2, 4, 6, 9, 13, 21 and 22), has a straight cylindrical general external shape, elongate along an axis 2, which is also common to FIGS. 5*a* to 5*e*. The term "cylindrical" should be understood as defining an exactly cylindrical shape or else a shape that is only pseudo-cylindrical or that can adopt cylindrical shapes. Such a cylindrical shape is defined by a right generator segment (which also includes a pseudo-straight segment) and a guide curve which, according to the embodiments, is circular (FIG. 3), oval, polygonal or pseudo-polygonal, with more or less rounded angles or, conversely, more or less pointed angles. The reservoir 7, the casing 5, the cap 3 and the rod 4*a* of the applicator/rod 4 that are part of the container/applicator 1 are also cylindrical, as defined above, or can adopt cylindrical shapes. The squeegee 6 that is part of the container/applicator 1 has an annular shape that is compatible with the cylindrical shape of the aforementioned parts. The applicator 4*b* that is part of the container/applicator 1 belongs to a casing that is cylindrical, as defined above, or can adopt cylindrical shapes, or that is conical, frustoconical, ovoid, or of any other shape that is within the abilities of a person skilled in the art for this type of part.

Shapes based on non-circular guide curves are possible insofar as the operations for manufacturing, opening and closing the container/applicator 1 do not imply any relative rotational movement of its parts 3, 4, 5, 6 and 7, but only relative axial sliding movements, and insofar as the container/applicator 1 does not have threads for screwing/unscrewing.

In the figures, the axis 2 is arranged vertically and consequently the container/applicator 1 is also arranged vertically. However, the container/applicator 1 can have any other arrangement.

The container/applicator 1 combines a plurality of functional means—a removable closing means, a means for applying contents C, a wringing means, a casing means, and a means for receiving contents C—made up of five distinct parts which, in the finished container/applicator 1, are interlocked, nested and assembled with one another: these parts overlap one another at least partially, some parts surrounding others, they are joined together and each is secured to at least one other. These five parts are the cap 3, the applicator/rod 4, the casing 5, the squeegee 6 and the reservoir 7.

The reservoir 7 for receiving contents has a peripheral axial wall 9 with a generally cylindrical, hollow shape, with a face of smaller internal diameter 9*a* and a face of larger diameter 9*b*, a distal end 11*a* closed by a bottom 15 and an open proximal end 11*b* with a proximal edge 11*c* belonging to the wall 9. The wall 9 can have a constant, rather small, thickness, insofar as does not include threads. The reservoir 7 delimits, towards the bottom 15, a space for the contents C, which contains the applicator 4*b*.

The removable, hollow closure cap 3 has a hollow cylindrical peripheral axial skirt 3*a*, with an outer face 3*d* of larger diameter and an inner face 3*e* of smaller diameter, and a transverse top wall 3*b* and, opposite same, a transverse opening 3*c*, bounded by a free opening edge. The skirt 3*a* has a constant, rather small, thickness, insofar as it does not include threads.

The applicator/rod 4 comprises a rod 4*a*—which in the embodiments shown includes a combining portion 17—and an applicator 4*b*, the rod 4*a* and the applicator 4*b* forming a mutual axial extension of one another.

The cap 3 and the applicator/rod 4 are combined in a fixed rigid manner by means of the combining portion 17, by means 24 for fixed rigid combination of the cap 3 and the applicator/rod 4, and arranged so as to form a unitary structural cap/applicator/rod assembly 3-4 which forms a whole that can be handled, moved, combined with or separated from the rest of the container/applicator 1. This unitary assembly 3-4 closes the container/applicator 1, participates in the seal and finally allows the application of contents C.

The casing 5 is formed by (in the shown embodiments, made up of) a peripheral axial wall (reference 5 designates both the casing and this wall), with a distal end 8*a* and a proximal end 8*b*, which both end in a free edge, distal 5*g* and proximal 5*h*, respectively, and are open until the wall 5 so as to form two openings, distal 8*aa* and proximal 8*bb*, respectively. The wall 5 is bounded, in a given transverse plane, by a face 5*a* of smaller diameter and a face 5*b* of larger diameter. Apart from the possible exception of its protruding portion 33 (embodiment of FIG. 22), the casing 5 surrounds the reservoir 7 peripherally. The casing 5 occupies a fixed position with respect to the reservoir 7.

The hollow, annular squeegee 6 is distinct from both the reservoir 7 and the casing 6. It is a wall 6*a* shaped by manufacturing, with a distal edge 6*b* that is open and forms a smaller opening for the wringing function, and a proximal edge 6*c* that is open and forms a larger opening. Both the distal 6*b* and proximal 6*c* edges are transverse and spaced apart axially. The wall 6*a* is bounded by a face of larger diameter 6*d* and a face of smaller diameter 6*e*. The squeegee 6 is housed completely in the casing 5 that surrounds it peripherally, and occupies a fixed position with respect to same. It comprises an annular flange 6*f*, protruding centrifugally, bounded by a transverse proximal edge 6*fa*, a transverse distal edge 6*fb*, a peripheral edge of larger diameter 6*fc* and a peripheral edge of smaller diameter 6*fd*. The annular flange 6*f* is a proximal portion of the squeegee 6 which also includes a likewise annular distal portion 6*g*, similar to a truncated cone or a spherical segment, such as a general pseudo-semi-hemispherical shape in the embodiments shown. The distal portion 6*g* includes the distal edge 6*b* and the smaller opening of the squeegee 6. A centripetal annular bulge 6*i* can be provided on the face of smaller diameter 6*e* substantially facing the transverse distal edge 6*fb*.

The reservoir 7 and the casing 5 are interlocked, nested and assembled with a permanent, fixed rigid combination, so as to have a common axial length of the reservoir 7 and the casing 5.

The container/applicator 1 also comprises interface means including means for fixed rigid combination, means for removable rigid combination, temporary means for fixed rigid combination and sealing means. Thus, the parts 3, 4, 5, 6 and 7 that constitute the container/applicator 1 are combined with one another in a fixed rigid, removable rigid or temporary rigid manner, according to the parts and times.

The term "combination" should be understood as something that is joined together structurally.

The expression "fixed rigid combination", relating to two parts, should be understood as meaning that these two parts are securely connected to one another and cannot be normally separated or are not intended to be separated, the combination in question thus being permanent. Such is the case, for example, of the reservoir 7 and the casing 5.

The expression "removable rigid combination", relating to two parts, should be understood as meaning that these two parts are securely connected to one another and can be separated because they are intended to be separated, at least at certain times. Such is the case of the cap 3 (with which the applicator/rod 4 is combined in a fixed rigid manner) relative to the rest of the container/applicator 1.

The expression "temporary fixed rigid combination", relating to two parts, should be understood as meaning that these two parts are securely connected to one another and cannot be normally separated, but only for a limited time. Such is the case of the squeegee 6 and the casing 5 when, during manufacture, the reservoir 7 is not yet combined in a fixed rigid manner with and inside the casing 5.

The terms "external" and "internal" should be understood as describing what is normally visible and invisible, respectively, for an observer looking at the assembled and closed container/applicator 1.

The term "axial" should be understood as describing what is on the axis 2 or parallel (or substantially parallel) to same or extending along same, the term "transverse" as describing what is strongly secant to the axis 2, such as orthogonally or substantially orthogonally, and the term "radial" as describing what extends in a direction orthogonal or substantially orthogonal to the axis 2.

The term "end", used in relation to the reservoir 7 and the casing 5, should be understood as designating the axial segment that terminates the corresponding part at one of its ends.

Figure 1:
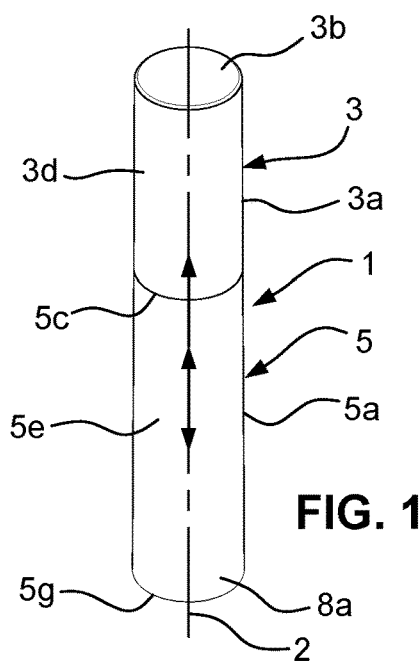
FIG. 1 is a perspective view of a container/applicator according to the invention, in the assembled state, closed and filled with contents, according to a first embodiment. Here, the bottom closes the distal opening of the casing, the common axial length of the reservoir and the casing matching that of the reservoir and of the distal portion of the casing.
Figure 2:
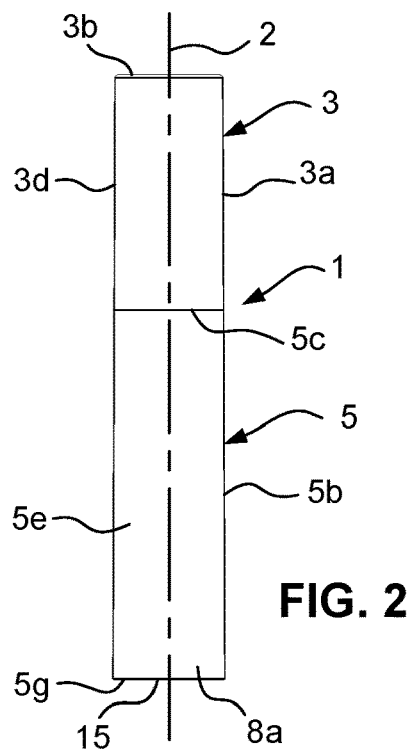
FIG. 2 and FIG. 3 are two views of the container/applicator of FIG. 1, front and end views, respectively.
Figure 4:
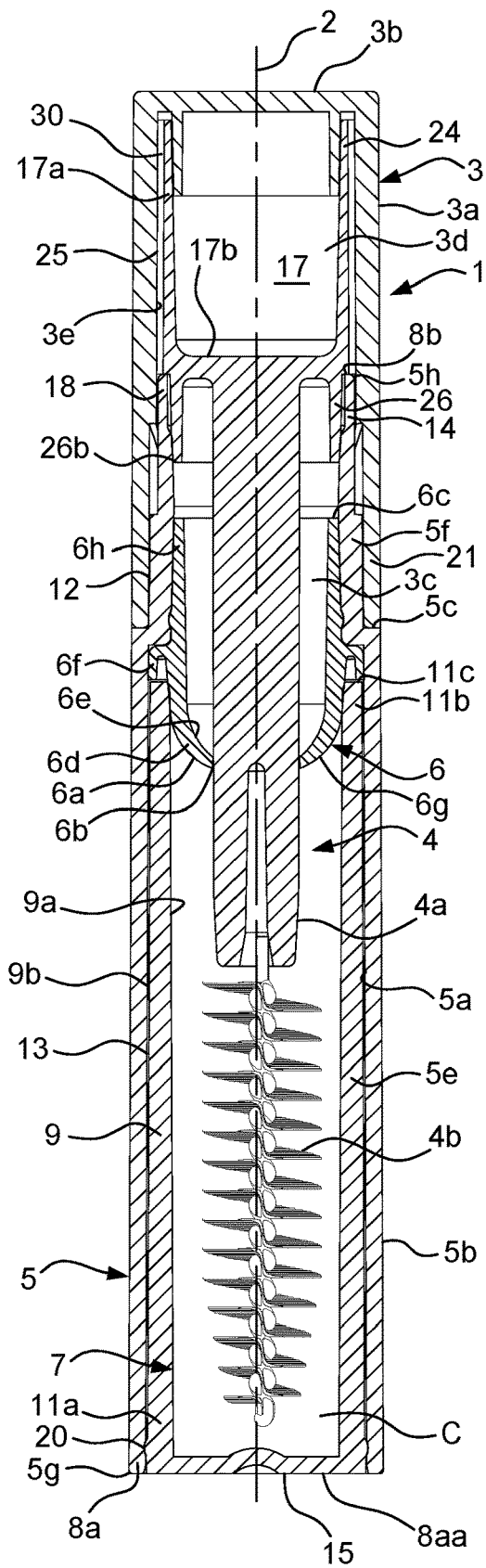
FIG. 4 is a view of the container/applicator of FIGS. 1 to 3, in axial cross-section along the line IV-IV of FIG. 2, on a larger scale.
Figure 7:
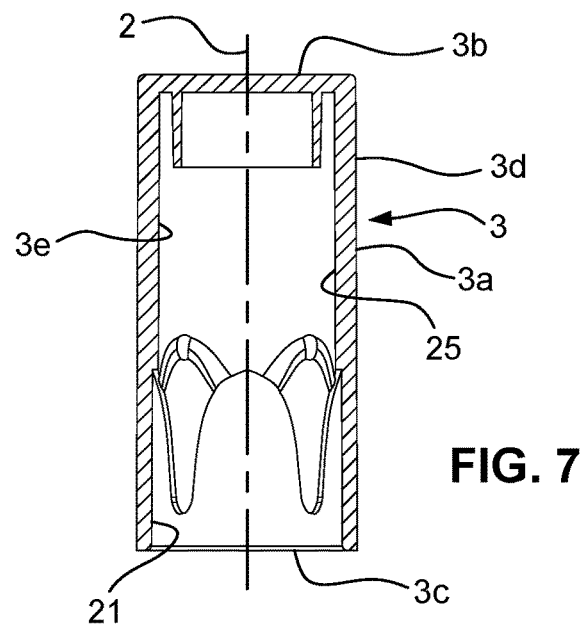
FIG. 7 is an axial cross-section view of an embodiment of the cap.
Figure 8:
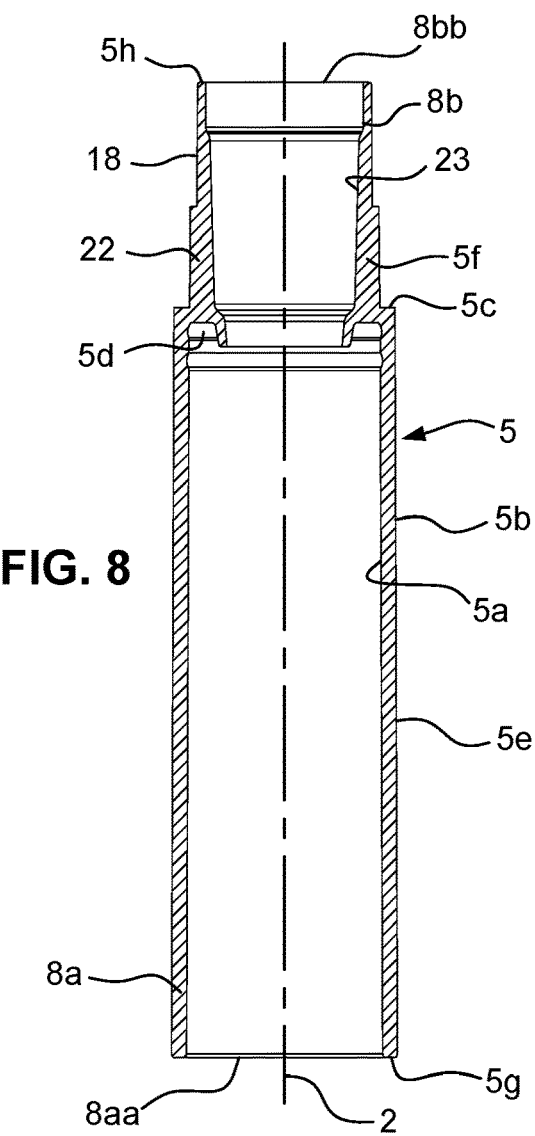
FIG. 8 is an axial cross-section view of an embodiment of a peripheral casing, both of which can be implemented for a range of container/applicators having a given overall external length, a given overall external diameter, and a capacity selected from a range of capacities.

The term "distal" should be understood as describing a means that is far from or farthest from the top wall 3b of the cap 3, and the term "proximal" should be understood as describing a means that is close to or closest to this wall 3b. Arrows P and D of FIGS. 1 and 4 show the proximal and distal directions, respectively.

The term "peripheral" should be understood as describing what is around or on the edge of the axis 2.

For a peripheral means, such as a wall for example, a distinction is made between that which is "of smaller diameter", that is to say closest to the axis 2, and that which is "of larger diameter", that is to say farthest from the axis 2. The term "diameter" should not be understood in its narrow mathematical sense but rather as meaning the dimension in the radial direction.

The casing 5, the squeegee 6 and the reservoir 7 are separate, integrally manufactured parts, which means that each of them is manufactured separately, directly in a single finished block.

The cap 3 is also a separate, integrally manufactured part.

As regards the applicator/rod 4, according to the embodiments, it is formed of a separately manufactured part or of the fixed rigid combination of the rod 4a—including the combining portion 17—and the applicator 4b.

The invention relates to the container/applicator 1 in the assembled state, closed and filled with contents C, which is how the container/applicator 1 is normally found for presentation and sale to customers. In this state, all the parts of the container/applicator 1 are joined together and arranged between them appropriately, the container/applicator 1 being closed by the cap 3 and the reservoir 7 containing contents C.

The invention also relates to the container/applicator 1 in any other configuration: the configuration in which parts 3, 4, 5, 6 and 7 are not all assembled or are partially assembled, or are all dismantled or partially dismantled; the configuration in which the container/applicator 1 is open and the cap/applicator/rod 3-4 is removed; and the configuration in which the container/applicator 1 is entirely or partially empty of contents C.

"Open" refers to the situation, the configuration or the state in which the cap 3 is separated from the rest of the container/applicator 1, so as not to close the reservoir 7. In this open state, the applicator/rod 4—since it is part of the cap/applicator/rod 3-4 unit—is also separated from the rest of the container/applicator 1 and is removed from the reservoir 7. "Closed" refers to the situation, the configuration or the state in which the cap 3 is combined with the rest of the container/applicator 1, so as to close the reservoir 7. The terms "opening" and "closing" should be understood to mean the transition from the closed state to the open state or from the open state to the closed state, respectively. The user proceeds to open the container/applicator 1 for use, to apply the contents C. The user closes the container between two uses, in order to protect the contents C and the applicator 44b.

The invention also relates to the sub-assembly 3+4+5+6 (FIGS. 23 and 24), which comprises the cap 3 and the applicator/rod 4 (or the cap/applicator/rod 3-4), the casing 5 and the squeegee 6, but not the reservoir 7.

In such a sub-assembly, the squeegee 6 is a part separate from the casing 5 and is housed completely in the casing 5. The squeegee 6 is temporarily combined in a fixed rigid manner to the casing 5 by the means for temporary fixed rigid combination of the squeegee 6 and the casing 5, during the manufacture of the sub-assembly 3+4+5+6.

Such a sub-assembly 3+4+5+6 is specially capable of and intended for constituting, when it is interlocked, nested and assembled in a fixed rigid manner with a reservoir 7 filled with contents C, the container/applicator 1 in the assembled state, closed and filled with contents C. Such a sub-assembly 3+4+5+6 is indeed designed to be manufactured as such a unitary sub-assembly by rigid combination of the cap 3, the applicator/rod 4 (or the cap/applicator/rod 3-4), the casing 5, and the squeegee 6, and to be stored, transported, handled and implemented as such with a view to manufacturing the container/applicator 1, as indicated.

The invention also relates to the reservoir 7, since it is especially capable of and intended for constituting, when filled with contents C, and interlocked, nested and assembled with the sub-assembly 3+4+5+6, the container/applicator 1 in the assembled state, closed and filled with contents C. Such a reservoir 7 is indeed designed to be manufactured as such, and to be stored, transported, handled and implemented as such with a view to manufacturing the container/applicator 1, as indicated.

Said sub-assembly 3+4+5+6 and said reservoir 7 have the features described elsewhere in relation to the container/applicator 1.

Because of their designs and their lack of threads, the cap 3, the casing 5, the squeegee 6, the reservoir 7 and the applicator/rod 4—or at least its rod 4a including the combining portion 17—can be made of plastic material and manufactured by injection using simple moulds without slides.

Each of the parts that are the cap 3, the applicator/rod 4, the casing 5, the squeegee 6 and the reservoir 7, have overall hold, that is to say that the part keeps its shape once manufactured.

Each of the parts that are the cap 3, the casing 5 and the reservoir 7 have a certain overall rigidity, being made of a fairly hard plastic material, such as polypropylene (abbreviated as PP). The expression "overall rigidity" should be understood here to mean that the part under consideration, subjected to a force not exceeding that resulting from its normal use or from the normal use of the container/applicator 1 by the user, keeps the overall shape resulting from its manufacture, which does not exclude slight local deformation during the manufacture of the container/applicator 1 or during its use, for example such as its opening and closing. Such a slight local deformation is, for example, typically that which results from the sliding engagement of a boss and a complementary recess for combination purposes.

The applicator/rod 4 has the combined overall rigidity and flexibility known to those skilled in the art for this type of part.

The squeegee 6 is flexible, being made of a plastic material chosen for this purpose, for example such as low density polyethylene (abbreviated as LDPE) or a thermoplastic elastomer such as a thermoplastic vulcanisate (abbreviated as TPV). The term "flexible" should be understood here to mean a certain suppleness allowing deformation within the limits of what is necessary during the manufacture of the container/applicator 1 or during its use, for example such as its opening and closing, and the axial sliding passage of the rod 4 and the applicator 4b through the squeegee 6. In one possible embodiment, a radial clearance exists between the rod 4a and the distal edge 6b bounding the smaller opening of the squeegee 6, without this affecting the seal of the container/applicator 1.

Figure 21:
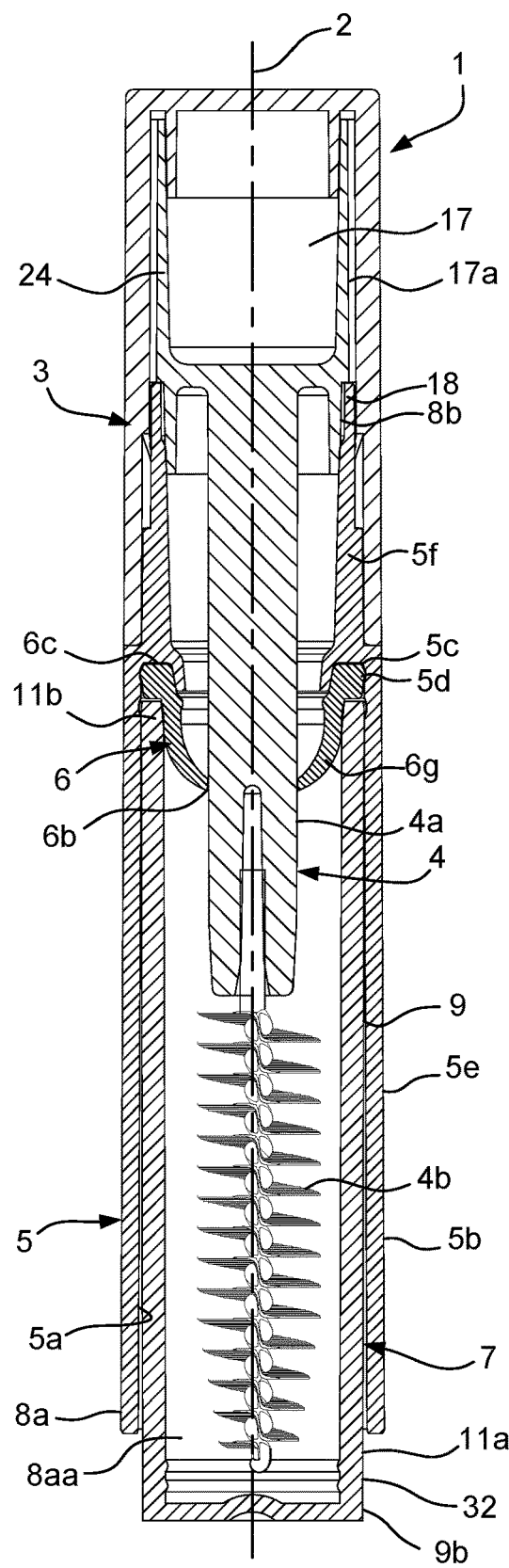
FIG. 21 is a axial cross-section view of a container/applicator according to a fifth embodiment, similar to the fourth, but in which the bottom of the reservoir is positioned below the distal edge of the casing, so that the casing protrudes axially beyond the reservoir in the distal direction, the common axial length of the reservoir and the casing matching that of the reservoir and being smaller than that of the distal portion of the casing.
Figure 22:
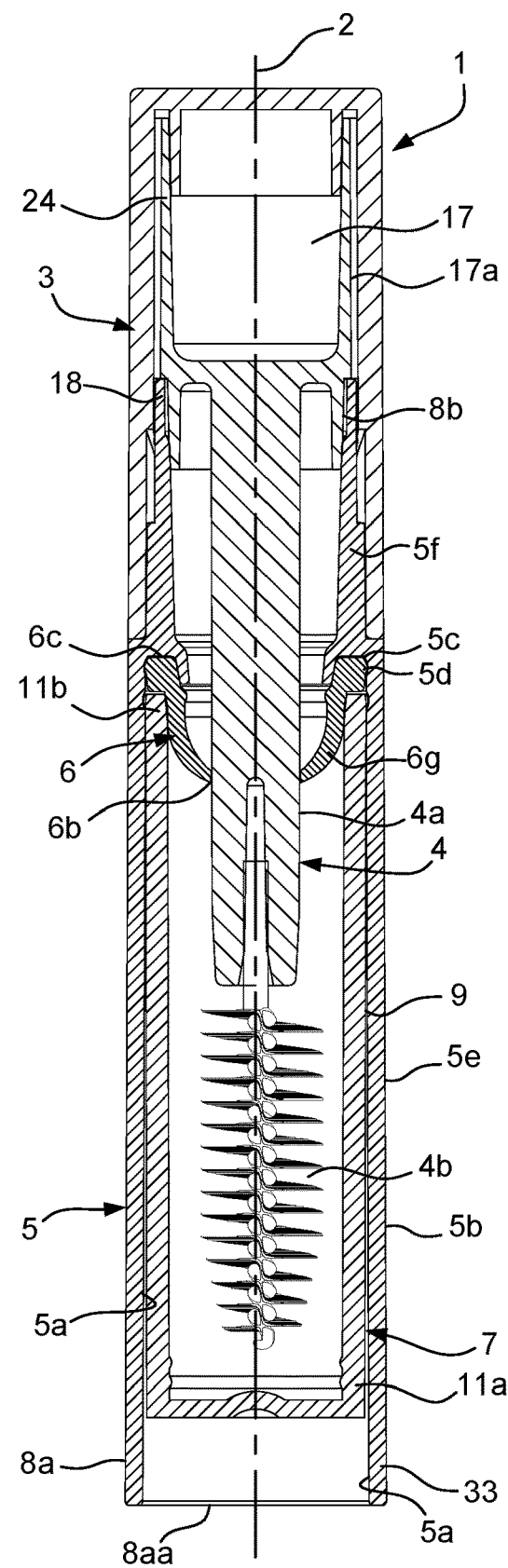
FIG. 22 is an axial cross-section view of a container/applicator according to a sixth embodiment, similar to the fourth, but in which the bottom of the reservoir is positioned beyond the distal edge of the casing, so that the reservoir protrudes axially beyond the casing in the distal direction, the common axial length of the reservoir and the casing being smaller than that of the reservoir and matching that of the distal portion of the casing.

The top wall 3b of the cap 3 is one of the two ends of the container/applicator 1, the other one being either the bottom 15 of the reservoir 7 (FIGS. 4, 6, 9, 13 and 21) or the distal end 11a of the casing 5 (FIG. 22). In the figures, the top wall 3b is placed in the upper position and the bottom 15 is placed in the lower position. Hereinafter, the container/applicator 1 is arranged according to the vertical axis 2, with the cap 3 at the top and the reservoir 7 at the bottom; however, as indicated, the container/applicator 1 can be in any other arrangement. The term "bottom 15" is therefore not in itself limiting to a lower position.

In the embodiments shown, the rod 4a—including the combining portion 17—and the applicator 4b which, once combined in a fixed rigid manner, form the applicator/rod 4, are two distinct parts, manufactured separately, assembled and combined in a fixed rigid manner, so as to form a mutual extension of one another, the applicator 4b being opposite the combining portion 17. For example, the rod 4a is provided with an axial end recess in which an end stud of the applicator 4b is mounted axially, in a fixed rigid manner by force. This makes it possible, with a single given type of rod 4a, to use a broad range of applicators 4b. Where appropriate, a small intermediate rod may be provided between the rod 4a and the applicator 4b, having a smaller diameter than the rod 4a, arranged at the centre of the applicator 4b.

The rod 4a and the applicator 4b are axially elongate, so that the applicator 4b can enter the reservoir 7 as far as the bottom 15 of same. The diameter of the rod 4a—not including the combining portion 17—and the diameter of the applicator 4b are restricted, so that they can pass through the opening of smaller diameter of the distal edge 6b of the squeegee 6.

The rod 4a can be the subject of a number of embodiments, particularly as regards its shape and its diameter.

The applicator 4b can also be the subject of a number of alternative embodiments, in particular with regard to its constitution, features, shape and size. It is chosen from a brush, a wand, a flexible or rigid tip, or any other suitable application member, according to the intended applications.

In embodiments in which the rod 4a and the applicator 4b are two distinct parts combined with one another in a fixed rigid manner, the applicator 4b can be chosen among those available on the market as a component.

In the embodiments shown, the applicator 4b is of the brush type with an axial support supporting bristles arranged transversely and radially, and ending at the stud for rigid combination with the rod 4a provided with a matching recess. However, this embodiment is not limiting.

The combining portion 17 is the portion belonging to the applicator/rod 4 of the means 24 for fixed rigid combination of the cap 3 and the applicator/rod 4. Indeed, the cap 3 and the applicator/rod 4 do not have to be separated from one another once the container/applicator 1 is manufactured and when the container/applicator 1 is being used. Thus, the cap 3 and the applicator/rod 4 form the unitary cap/applicator/rod assembly 3-4.

The combining portion 17 comprises a peripheral axial wall, with a generally cylindrical and hollow shape. Its largest diameter, corresponding to its peripheral face of larger diameter 17a, is larger than that of the rod 4a, for example around 2 to 4 times its size (this feature being illustrative and not limiting).

The combining portion 17 is rigidly secured to the rod 4a, at its end, by means of a transverse wall 17b, on either side of which the combining portion 17 and the rod 4a extend axially.

In the embodiments shown, the rod 4a, the combining portion 17 and the transverse wall 17b form an integrally manufactured assembly.

The means 24 for fixed rigid combination of the cap 3 and the applicator/rod 4 are the mating of a portion 25 of the inner face 3e of the skirt 3a of the cap 3, towards its top wall 3b, with the face of larger diameter 17a of the combining part 17. These two faces 3e and 17a have the same diameter, within the structural and assembly tolerances, so as to allow first the insertion—by axial pushing—of the combining portion 17 by its free end, opposite the rod 4a, into the cap 3 by its opening 3c, with no radial space therebetween, and then relative axial sliding followed by fixed rigid combination by peripheral contact of the two faces 3e and 17a. This insertion and this sliding are carried out by force. In the embodiments shown, the portion 25 extends axially over a substantial portion of the axial length of the cap 3, for example around one third or one half. To avoid a pistoning effect that might prevent axial sliding, at least one small axial groove 30, open at both ends, forming a vent, is provided on the inner face 3e and/or on the face of larger diameter 17a.

The term "mated"—and its variants such as "mating"—relating to two parts, or to portions thereof, such as faces, should be understood as contact between these two parts or portions of parts, suitable for the purpose of combination or sealing.

The expression "axial pushing" relating to two parts should be understood as a relative axial sliding movement thereof (movement of one of the two parts or of both parts), resulting from the application of sufficient axial forces to same, in order to mate them. The magnitude of the axial pushing is suited to the purpose of the mating.

Thus, peripheral contact of the two peripheral axial faces means that each of these two faces, which are coaxial, comprises one (or more) contact zones, in contact with one (or more) contact zones of the other face, this (or these) contact zones being disposed at the periphery of each of these faces. Such peripheral contact is provided for the purpose of combination or sealing.

For the purpose of combination, discontinuous contact zones can be envisaged around the axis 2, with one or more axial grooves to avoid a pistoning effect.

The contact between the contact zones is adapted to the desired combination (permanent fixed rigid, removable rigid or temporary fixed rigid).

Thus, for a permanent fixed rigid combination, the contact must ensure sufficient radial clamping. This is the intended meaning of the term "radial clamping". The axial insertion and the axial sliding resulting from the axial pushing are then carried out by force, so as to exceed the contact friction between the two parts.

For a removable rigid combination, the contact can involve more or less gentle or more or less hard friction, provided that it is not fixed, with normal action, such as that exerted by the user on the cap 3 with a view to combining it with or separating it from the rest of the container/applicator 1.

In the case of sealing, each contact zone must be continuous around the entire axis 2 and the contact must be sealed to the desired degree, it being understood that, depending on the case, the combination will be permanent fixed rigid (case of the squeegee 6) or removable fixed rigid (case of the cap 3).

The assembly of the rod 4a, the combining portion 17 and the transverse wall 17b also comprises, as part of the integrally manufactured assembly, a neck 26 rigidly secured to the rod 4a via the transverse wall 17b, via which the neck 26 extends axially until its distal edge 26b on the same side as the rod 4a that it surrounds and on the side opposite the combining portion 17.

The neck 26 comprises a peripheral axial wall having a generally cylindrical, hollow shape. Its largest diameter, which corresponds to its peripheral face of larger diameter 26a, is slightly smaller than that of the peripheral face of larger diameter 17a of the combining portion 17 and larger than that of the rod 4a, for example around 2 to 4 times its size (this feature being illustrative and not limiting). Thus, there is a small radial step 31, forming an axial stop between the two faces 26a and 17a.

In the embodiment shown, the neck 26 extends axially over a fraction of the axial length of the cap 3, for example around ⅕ to ⅐ (this feature being illustrative and not limiting). Thus, in the assembled and closed container/applicator 1, the skirt 3a extends axially in a distal direction well beyond the distal edge 26b of the neck 26, allowing a casing portion 5 to be housed therein.

By means of a step 5c, the wall of the casing 5 has a generally cylindrical, hollow shape and peripherally delimits a space extending axially and radially, in which the reservoir 7, the squeegee 6, the rod 4a (except for the combining portion 17) and the applicator 4b are housed in the closed state, and the reservoir 7 and the squeegee 6 are housed in the open state.

The distal end 8a of the casing 5 is located towards the bottom 15 of the reservoir 7 and the applicator 4b when it is arranged in the reservoir 7. The proximal end 8b of the casing 5 is located in the cap 3 in the closed state of the container/applicator 1. It is clear, visible and free to access in the open state.

The wall 5 of the casing, and therefore the casing 5 itself, comprises the transverse step 5c, of which the portion inside the casing 5 is referred to as shoulder, this term to be understood as meaning a transverse change in diameter of the face of smaller diameter 5a of the casing 5 (hereinafter, the reference 5c denotes both the step and the shoulder).

In the embodiment of FIGS. 4 and 6, the step 5c forms a simple double elbow.

In the embodiment of FIGS. 9, 13, 19, 21 and 22, the step 5c comprises an axially directed inner return in the distal direction, so as to form an annular groove 5d that is open in the distal direction.

With the step 5c, the casing 5 consists of two parts 5e and 5f forming an axial extension of one another, joined by the step 5c and disposed respectively on either side of same.

The portion 5e is externally distal and of larger diameter, its face 5a of larger diameter being always on the outside. It accommodates, according to the embodiments, either a portion (FIGS. 4 and 6) or all (FIGS. 9, 13, 19, 21 and 22) of the squeegee 6, and all (FIGS. 4, 6, 9, 13 and 22) or a portion—except for a protruding portion 32 combined with the distal end 11a (FIG. 21)—of the reservoir 7. It also accommodates, in the closed state, a portion of the rod 4a adjacent to the applicator 4a and the applicator 4b.

The portion 5f is proximal and of smaller diameter. It is located (entirely in the embodiments shown) in the cap 3 in the closed state, and clear, visible to an observer and free to access in the open state, the face 5b of larger diameter of the casing 5 at the portion 5f being on the inside in the closed state and on the outside in the open state. It accommodates, in the closed state, a portion of the rod 4a adjacent to the combining portion 17 and, in the embodiment of FIGS. 4 and 6, a portion of the squeegee 6. In the open state, the portion 5f is clear, except for the presence of a portion of the squeegee 6 in the embodiment of FIGS. 4 and 6, the face of smaller diameter 5a of the casing 5 at the portion 5f being either entirely visible (FIGS. 9, 13, 19, 21 and 22) or partially visible (FIGS. 4 and 6) for an observer looking at the container/applicator 1 axially by the proximal free edge 5h.

The distal portion 5e and the proximal portion 5f each extend over a substantial axial length, the distal portion 5e being longer in the embodiments shown than the proximal portion 5f, for example several times longer (such as around 3 to 5 times longer, this feature being illustrative and not limiting).

In the embodiments shown, the radial thickness of the step 5c is equal to or substantially equal to the thickness of the wall 5. Thus, the face of larger diameter 5b of the casing 5 at the proximal portion 5f and the face of smaller diameter 5a of the casing 5 at the distal portion 5e are aligned or substantially aligned.

The casing 5 extends over an axial length that represents a significant fraction of the axial length of the container/applicator 1, such as around 0.7 to 0.9 (this feature being illustrative and not limiting). The casing 5 extends over an axial length that is longer than the axial length of the cap 3, such as around 1.5 to 3 times longer (this feature being illustrative and not limiting).

If it is not a proximal end portion 18 thinned towards its proximal end 8b, the wall of the casing 5 have a constant, rather small, thickness, insofar as it does not include threads.

Unless there is a protruding portion 32 (FIG. 21), the reservoir 7 is peripherally surrounded by the casing 5 and occupies a fixed position relative thereto. The casing 5, more precisely the distal portion 5e thereof, and the reservoir 7 are adjusted to one another, that is to say that the face 5a of smaller diameter of the distal portion 5e of the casing 5 and the face of larger diameter 9b of the reservoir 7 are adjusted to one another.

The bottom 15 is connected to the distal end 11a of the wall 9, forming an angle, without the presence of peripheral channel.

The inner face 9a of smaller diameter of the wall 9 is smooth and free of ridges or cavities which could prevent the extraction of the contents C.

In the embodiment of FIGS. 4, 6, 9 and 13, the bottom 15 is positioned in a coplanar fashion relative to the distal free edge 5g of the casing 5, so as to close its distal opening 8aa. The common axial length of the reservoir 7 and the casing 5 matches the axial length of the reservoir 7 and that of the distal portion 5*e* of the casing 5, within the mounting clearance and within the axial thickness of the annular flange 6*f* of the squeegee 6.

In the embodiment of FIG. 21, the bottom 15 of the reservoir 7 is positioned beyond the distal free edge 5*g* of the casing 5, so as to protrude axially beyond the casing 5 in the distal direction, forming the protruding portion 32 combined with the distal end 11*a*. The common axial length of the reservoir 7 and the casing 5 is shorter than the axial length of the reservoir 7 and matches the axial length of the distal portion 5*e* of the casing 5, within the mounting clearance and within the axial thickness of the annular flange 6*f* of the squeegee 6.

In the embodiment of FIG. 22, the bottom 15 of the reservoir 7 is positioned below the distal free edge 5*g* of the casing 5, the casing 5 protruding axially beyond the reservoir 7 in the distal direction, forming a protruding portion 33 combined with the distal end 8*a*. The common axial length of the reservoir 7 and the casing 5 matches the axial length of the reservoir 7 and is shorter than the axial length of the distal portion 5*e*.

When the bottom 15 closes the distal opening 8*aa* or protrudes axially from the casing 5, it is designed to be flat overall, so as to be able to form a vertical bearing face for the container/applicator 1.

The face 9*b* of larger diameter of the reservoir 7 is an inner face, except for the possible protruding portion 32. If it is transparent or translucent, this protruding portion 32 may make it possible, if need be, to view the contents C or to detect their presence or absence.

The reservoir 7 is placed coaxially in the recess of the distal portion 5*e* of the casing 5 arranged peripherally, by means of a fixed rigid combination therebetween. The configuration of the casing 5 is adapted so that, during the manufacture of the container/applicator 1, the reservoir 7 filled with contents C can be inserted, starting with its proximal free edge 11*c*, into the open distal end 8*a* of the casing 5, by its distal free edge 5*g* and therefore into its distal opening 8*aa*, and then guided to slide axially into the casing 5 in the proximal direction.

In the embodiments of FIGS. 4, 9, 13, 21 and 22, the reservoir 7 comprises one and only one peripheral axial wall 9 which provides the function of bounding the space that receives the contents C, participating in the function of fixed rigid combination of the reservoir 7 and the casing 5 and in the sealing.

In the embodiment of FIG. 6, the reservoir 7 comprises a first wall 9*c* and a second wall 9*d*. These two walls 9*c* and 9*d*, which are peripherally axial, generally cylindrical and hollow, are arranged radially facing one another in a concentric fashion and are rigidly combined with one another by a connecting peripheral wall 9*e* so as to form an integrally manufactured assembly.

The wall 9*c* is of smaller diameter and it is combined with the bottom 15. This wall 9*c* participates in the function of bounding the space that receives the contents C.

The wall 9*d* is of larger diameter. This wall 9*d* radially surrounds the wall 9*c* leaving an annular space 9*f* between them, extending radially and axially. The wall 9*d* participates in the function of fixed rigid securing of the reservoir 7 to the casing 5.

The connecting wall 9*e* connects the walls 9*c* and 9*d*. It extends over a certain axial length. Its diameter along the axis 2 is smallest at the fixed rigid connection with the wall 9*c* of smaller diameter, and largest at the fixed rigid connection with the wall 9*d* of larger diameter. The connecting wall 9*e* therefore has a diameter that increases from its distal edge to its proximal edge.

The connecting wall 9*e* extends the wall 9*c* of smaller diameter axially from its connecting edge opposite the bottom 15, in the proximal direction. The connecting wall 9*e* diverges, with an inclination with respect to the axis 2, and in the distal direction, from the wall 9*d* of larger diameter a little away from the proximal free edge 11*c* of the reservoir 7, so as not to disturb the squeegee 6. Thus, the squeegee 6 can come into contact with the face of smaller diameter of the wall 9*d* of larger diameter.

In the embodiment of FIG. 6, the bottom 15 and the distal end 11*a* are coplanar. The axial length of the wall 9*d* of larger diameter corresponds to the sum of the axial length of the wall 9*c* of smaller diameter and the connecting wall 9*e*.

In an embodiment similar to that of FIG. 21, the bottom 15 is positioned beyond the distal end 11*a*. In the embodiment that is similar to that of FIG. 22, the bottom 15 is positioned below the distal end 11*a*.

In the assembled container/applicator 1, the proximal end 8*b* of the casing 5 (and its proximal free edge 5*h*) and the proximal end 11*b* of the reservoir 7 (and its proximal free edge 11*c*) are axially offset, the casing 5 extending beyond the proximal free edge 11*c* of the reservoir 7, forming the proximal portion 5*f* thereof. The flange 6*f* of the squeegee 6 is located in a portion of this axial offset.

The terms "wringing means" and "squeegee" are generally known and understood by those skilled in the art of applicators for cosmetic products. Such a wringing means or such a squeegee has a restricted opening for the applicator 4*b*.

In the embodiment of FIGS. 9, 11, 13, 15, 19, 21 and 22, the squeegee 6—and therefore the wall 6*a* which forms it—essentially comprises the annular flange 6*f* and the distal portion 6*g*. It is then the flange 6*f*, and specifically its transverse proximal edge 6*fa*, that forms the proximal edge 6*c* of the squeegee 6 which comprises its largest opening. The flange 6*f* can therefore be described as proximal, in an absolute manner.

In the embodiment of FIGS. 4, 5*d* and 6, the squeegee 6—and therefore the wall 6*a* which forms it—also comprises a more proximal portion 6*h* forming a neck. This neck 6*h* is generally cylindrical and hollow. It extends in the proximal axial direction from the flange 6*f*, which is then inserted between the distal portion 6*g* and the neck 6*h*. It is then the free edge of the neck 6*h* opposite the flange 6*f* that forms the proximal edge 6*c* which includes the larger opening of the squeegee 6. The flange 6*f* can still be described as proximal, but relative to the distal portion 6*g*.

When the applicator 4*b* is inserted into the reservoir 7, by axial sliding, in order to extract contents C, the applicator 4*b* first passes through the larger opening delimited by the proximal edge 6*c*, and then the smaller opening delimited by the distal edge 6*b*, which poses no difficulty due to the general shape similar to a truncated cone or a spherical segment of the distal portion 6*g*. When extracting the applicator 4*b* loaded with contents C from the reservoir 7, it first passes through the smaller opening defined by the distal edge 6*b*, which provides the wringing function, and then the larger opening delimited by the proximal edge 6*c*.

The container/applicator 1 further comprises the following interface means:
    means 12 for removable rigid combination of the cap 3
        (with the applicator/rod 4) with the remaining portion of the container/applicator 1, referred to as "means 12 for combining the cap 3 with the rest of the container/applicator 1", means 13 for fixed rigid combination of the reservoir 7 in the casing 5, referred to as "means 13 for combining the reservoir 7 with the casing 5", means 35 for permanent fixed rigid combination of the squeegee 6 with respect to the reservoir 7 and the casing 5, referred to as "means for combining the squeegee 6 with the reservoir 7 and the casing 5", means 36 for temporary fixed rigid combination of the squeegee 6 with the casing 5, while, during the manufacture of the container/applicator 1, the reservoir 7 has not yet been combined in a permanent fixed rigid manner to the casing 5, referred to as "means for temporary combination of the squeegee 6 and the casing 5", means 24 for fixed rigid combination of the cap 3 and the applicator/rod 4, previously described, and sealing means 14.

The means 12 for combining the cap/applicator/rod 3-4 with the rest of the container/applicator 1 are between the cap/applicator/rod 3-4 and the casing 5. These are of the type without threads for opening and closing by rotation. They involve peripheral contact of the mated surfaces of the cap/applicator/rod 3-4 and the proximal portion of the casing 5, by axial pushing.

Thus, a portion 21 of the inner face 3e of the skirt 3a of the cap 3, adjacent to its opening 3c and extending over a certain distance in the axial direction, is mated with the outer face of larger diameter 5b of the proximal portion 5f of the casing 5. This mating is suitable for allowing and ensuring, firstly, the axial insertion of the cap 3 onto the proximal portion 5f of the casing 5 in order to close the container/applicator 1, and then the reciprocal holding thereof by friction, in the absence of external separating stress, so that the container/applicator 1 remains closed, and finally, the separation thereof in order to open and use the container/applicator 1, via sufficient pulling by the user.

In the embodiments shown, the free opening edge bounding the opening 3c of the cap 3 is adjacent, within the mounting clearances, to the step 5c of the casing 5. The radial thickness of the skirt 3a is substantially equal to that of the step 5c, so that the cap 3 and the distal portion 5e of the casing 5 have outer faces extending away from one another, with no noticeable offset.

The means 12 for combining the cap/applicator/rod 3-4 with the rest of the container/applicator 1 may also comprise the mating of the face of larger diameter 26a of the neck 26 with the face of smaller diameter of the thinned proximal end portion 18 of the casing 5, by axial pushing. As a result, the thinned end portion 18—and thus the proximal end 8b of the casing 5—is inserted between the face of larger diameter 26a of the neck 26 and the zone of the inner face 3e of the skirt 3a of the cap 3 located opposite same.

In some embodiments, the cap 3 and the casing 5 may comprise means for relative angular positioning, such as one or more bump/recess assemblies formed on the cap/applicator/rod 3-4 and on the casing 5, which engage to provide the relative angular positioning. This allows an alignment of the text or decorations placed on the outer faces of the cap 3 and the casing 5. Otherwise, the cap 3 and the casing 5 may comprise means to assist with opening the container/applicator 1, such as one or more bump/recess assemblies provided on the cap/applicator/rod 3-4 and on the casing 5.

The reservoir 7 and the casing 5 are adjusted to one another, that is to say, within structural and assembly tolerances, the face of larger diameter 9b of the reservoir 7 and the face of smaller diameter 5a of the distal portion 5e of the casing 5 have the same diameter, so as to allow first insertion—by axial pushing—of the reservoir 7 by its proximal end 11b and its proximal free edge 11c, into the casing 5 by its open distal end 8a, by its distal free edge 5g and thus into its distal opening 8aa, followed by relative sliding of same in the proximal direction and finally fixed rigid combination of same by radial clamping of the mated surfaces thereof. In the embodiments shown, the face of larger diameter 9b and the face of smaller diameter 5a are smooth, so as to allow insertion and sliding in any relative angular position of the reservoir 7 and the casing 5 having a circular outline.

The means 13 for combining the reservoir 7 and the casing 5 comprise, in a generally functional manner, radial clamping, by axial pushing, of mated surfaces in contact of the face of larger diameter 9b of the reservoir 7 and the face of smaller diameter 5a of the distal portion 5e of the casing 5.

Figure 19:
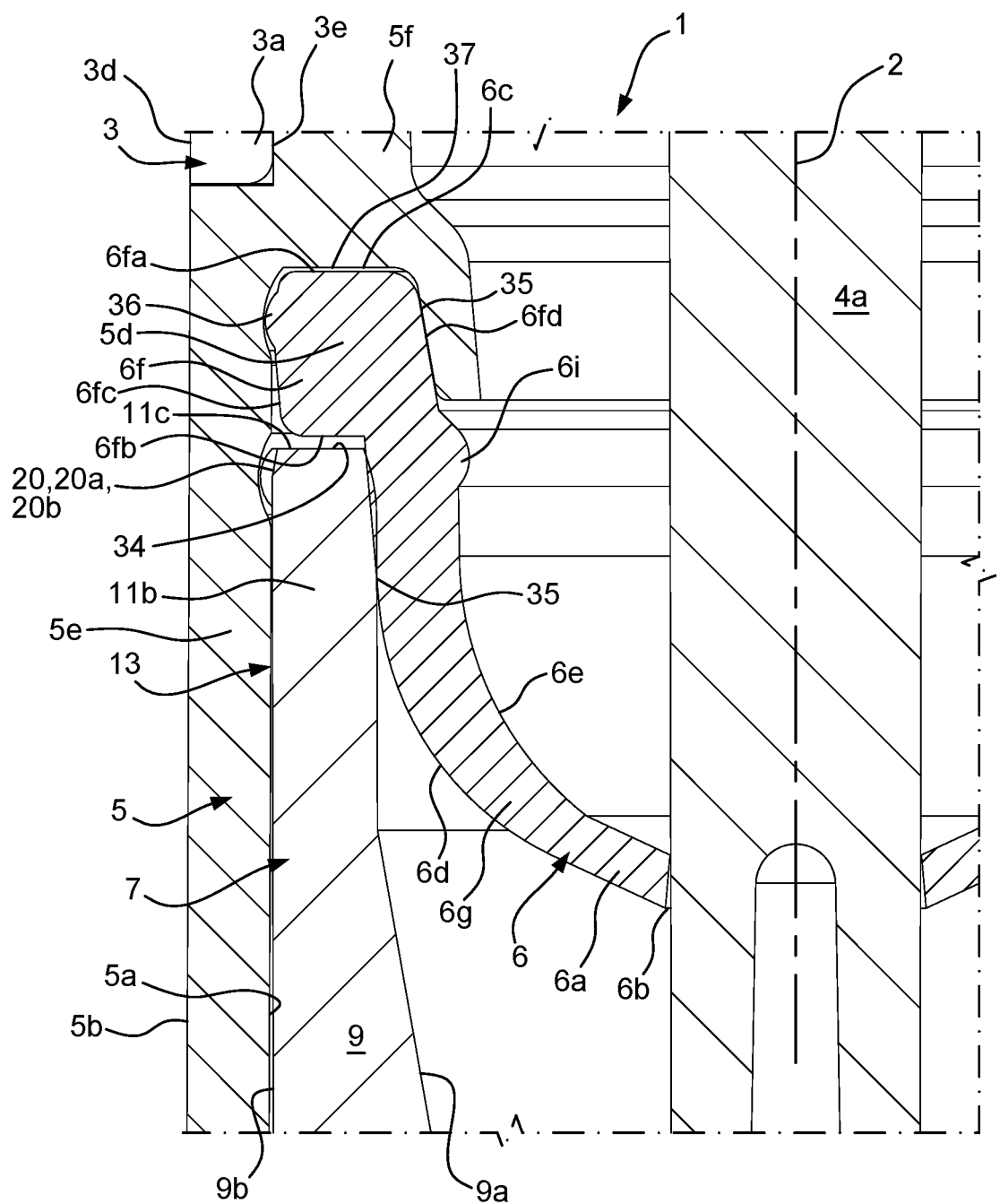
FIGS. 19 and 20 are two partial axial cross-section views, on a larger scale, respectively, of the casing with its step and its groove, of the proximal end of the reservoir and of the squeegee, and of the casing towards its open proximal end, and of the cap/applicator/rod illustrating, on the one hand, means for sealing by peripheral radial clamping and, on the other hand, in a pair of zones of faces with peripheral radial clamping, a small taper of at least one of the two zones of the pair.
Figure 20:
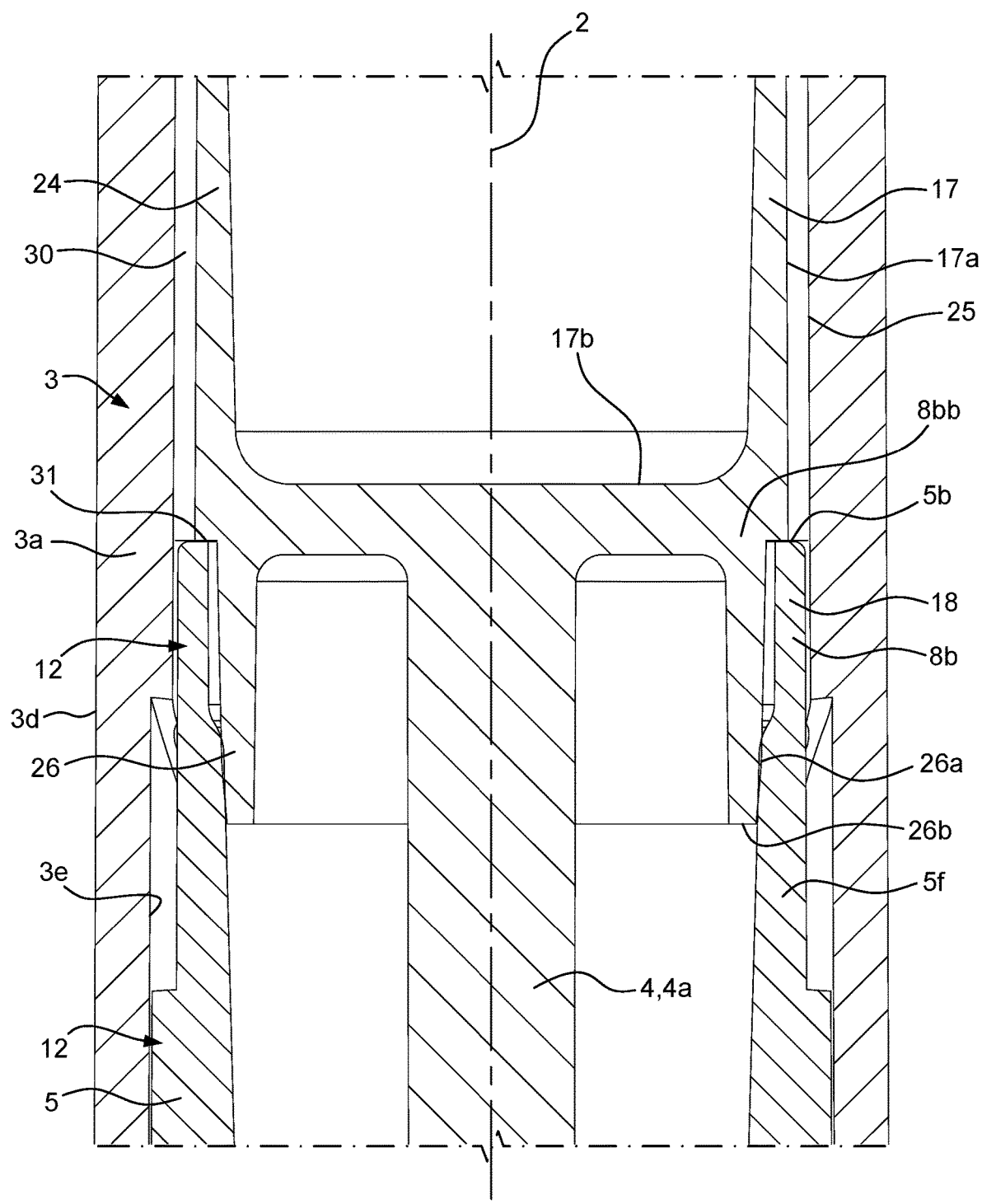

The means 13 for fixed rigid combination of the reservoir 7 and the casing 5 may also comprise relative axial holding of the reservoir 7 and the distal portion 5e, carried out with a boss/recess combination 20, comprising a boss on the face 9b of the reservoir 7 and a recess on the face 5a of the distal portion 5e, located in the common axial length of the reservoir 7 and the casing 5, by axial pushing for radial clamping. Such a boss/recess combination 20 can be the subject of many embodiments. Such a boss/recess combination 20 defines the exact relative axial position of the reservoir 7 relative to the casing 5, so that the proximal free edge 11c of the reservoir 7 does not have to come into axial contact with another part of the container applicator 1, a small axial clearance 34 existing between the proximal free edge 11c of the reservoir 7 and the flange 6f of the squeegee 6 (FIG. 19).

Figure 17:
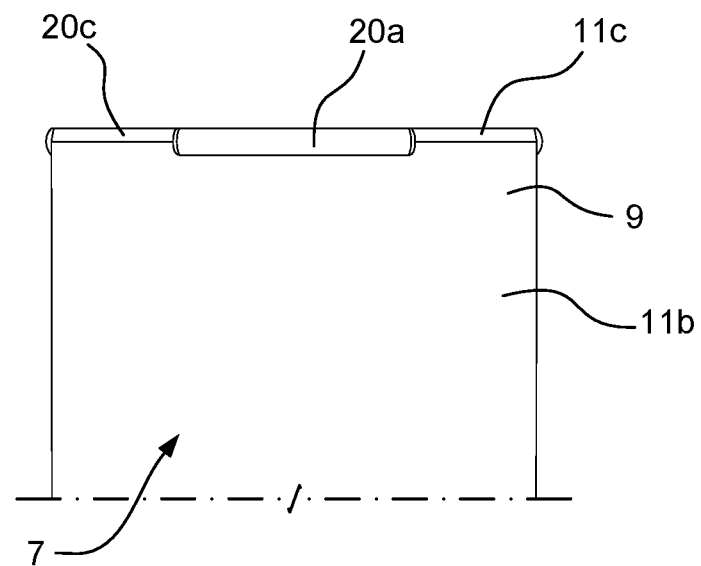
FIG. 17 is a partial axial cross-section view, on a larger scale, of the proximal end of the reservoir.
Figure 18:
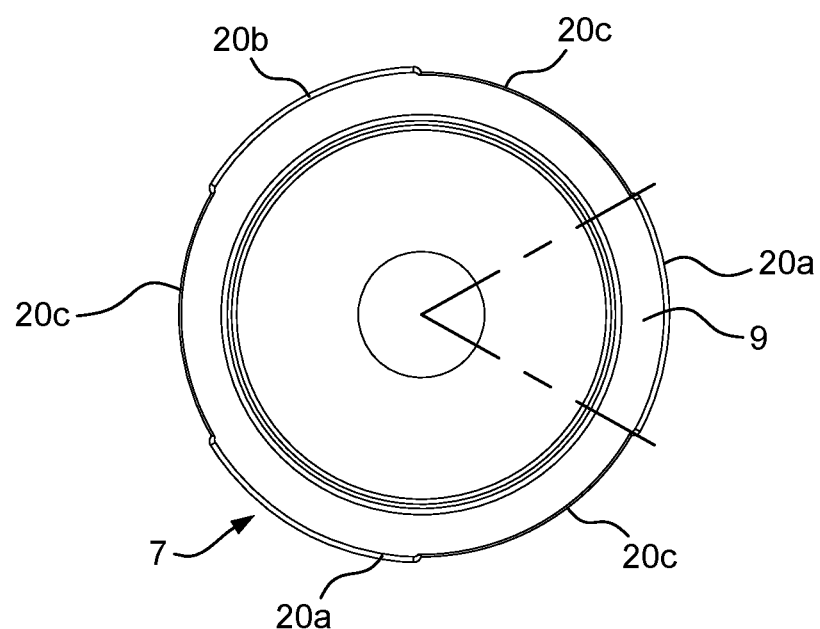
FIG. 18 is an axial view of this proximal end, showing bosses for fixed rigid combination of the reservoir with the casing and vents for preventing pistoning when, during manufacture, the unitary cap/applicator/rod/squeegee/casing sub-assembly and the reservoir filled with contents are interlocked, nested and combined by sliding axially.

In the embodiments of FIGS. 9, 10, 13, 14, 17, 18, 21 and 22, the means 13 for fixed rigid combination of the reservoir 7 and the casing 5 comprise, on a proximal portion with clamping of the common axial length of the reservoir 7 and the casing 5 adjacent to the proximal free edge 11c of the reservoir 7 and to the inner shoulder 5c, the previously indicated radial clamping, with axial pushing, of mated surfaces in contact of the face of larger diameter 9b of the reservoir 7 and the face of smaller diameter 5a of the distal portion 5e of the casing 5. In this case, the wall 9 of the reservoir 7 and the wall of the distal portion 5e have a clearance taper so that the face of larger diameter 9b and the face of smaller diameter 5a have a radial clearance therebetween on a distal portion with clearance of the common axial length of the reservoir 7 and the casing 5. Thus, the common axial length of the reservoir 7 and the envelope 5 comprises the proximal portion with clamping and the distal portion with clearance. The radial clearance in question is very small and virtually undetectable by the user. The boss/recess combination 20 is then located in the proximal portion with clamping, as illustrated by FIGS. 17, 18 and 19, which show the proximal end 11b of the reservoir 7. On the proximal free edge 11c of the reservoir 7, a plurality of centrifugal transverse bosses 20a are provided spaced peripherally apart from one another by boss-free zones, engaging with one or more recesses 20b formed on the face of smaller diameter 5a of the distal portion 5e of the casing 5 and towards the inner shoulder 5c. The boss-free zones 20a between the centrifugal transverse bosses 20a form vents 20c to prevent pistoning when, for manufacture, the unitary cap/applicator/rod/squeegee/casing sub-assembly 3+4+5+6 is interlocked, nested and combined with the reservoir 7 filled with contents C in a fixed rigid manner by sliding axially.

In the embodiments of FIGS. 4 and 6, the means for fixed rigid combination of the reservoir 7 and the casing 5 comprise, over at least substantially the entire common axial length of the reservoir 7 and the casing 5, a radial clamping, by axial pushing, of mated surfaces in contact of the face of larger diameter 9b of the reservoir 7 and the face of smaller diameter 5a of the distal portion 5e of the casing 5. In this case, a boss/recess combination 20 can be located in the distal portion of the common axial length of the reservoir 7 and the casing 5 towards the bottom 15 of the reservoir 7.

The configuration of the casing 5 is suitable so that, during the manufacture of the container/applicator 1, the squeegee 6 filled with contents C can be inserted, starting with its proximal free edge 6c, into the open distal end 8a of the casing 5, by its distal free edge 5g and therefore into its distal opening 8aa, and then guided to slide axially into the casing 5 in the proximal direction.

With the manufacture of the sub-assembly 3+4+5+6, the squeegee 6 is held by means 36 for temporary fixed rigid combination with the casing 5, when the reservoir 7 filled with contents C is not yet combined in a fixed rigid manner with the casing 5 of the sub-assembly 3+4+5+6. During the manufacture of the container/applicator 1, by fixed rigid combination to the casing 5 of the sub-assembly 3+4+5+6 of the reservoir 7 filled with contents C, the squeegee 6 is held by means 35 for permanent fixed rigid combination with the reservoir 7 and the casing 5.

Figure 23:
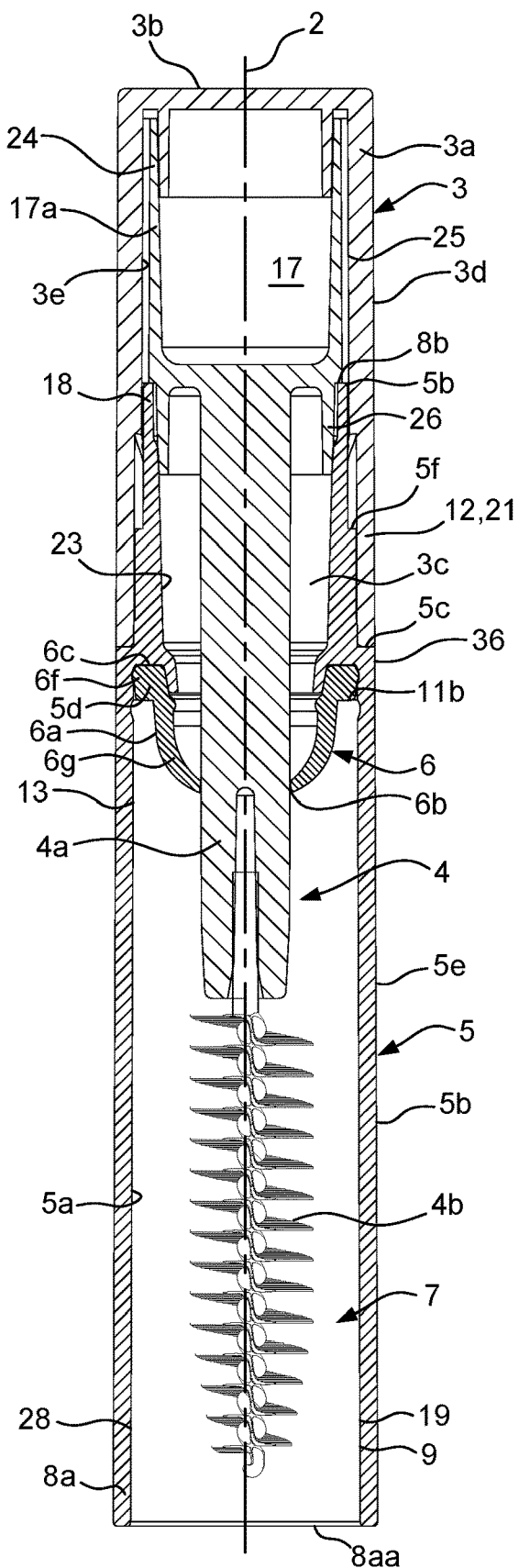
FIG. 23 is an axial cross-section view of a unitary cap/applicator/rod/squeegee/casing sub-assembly with a view to producing a container/applicator according to the fourth embodiment of FIG. 13, by means of interlocking, nesting and fixed rigid combination with a reservoir filled with contents.
Figure 24:
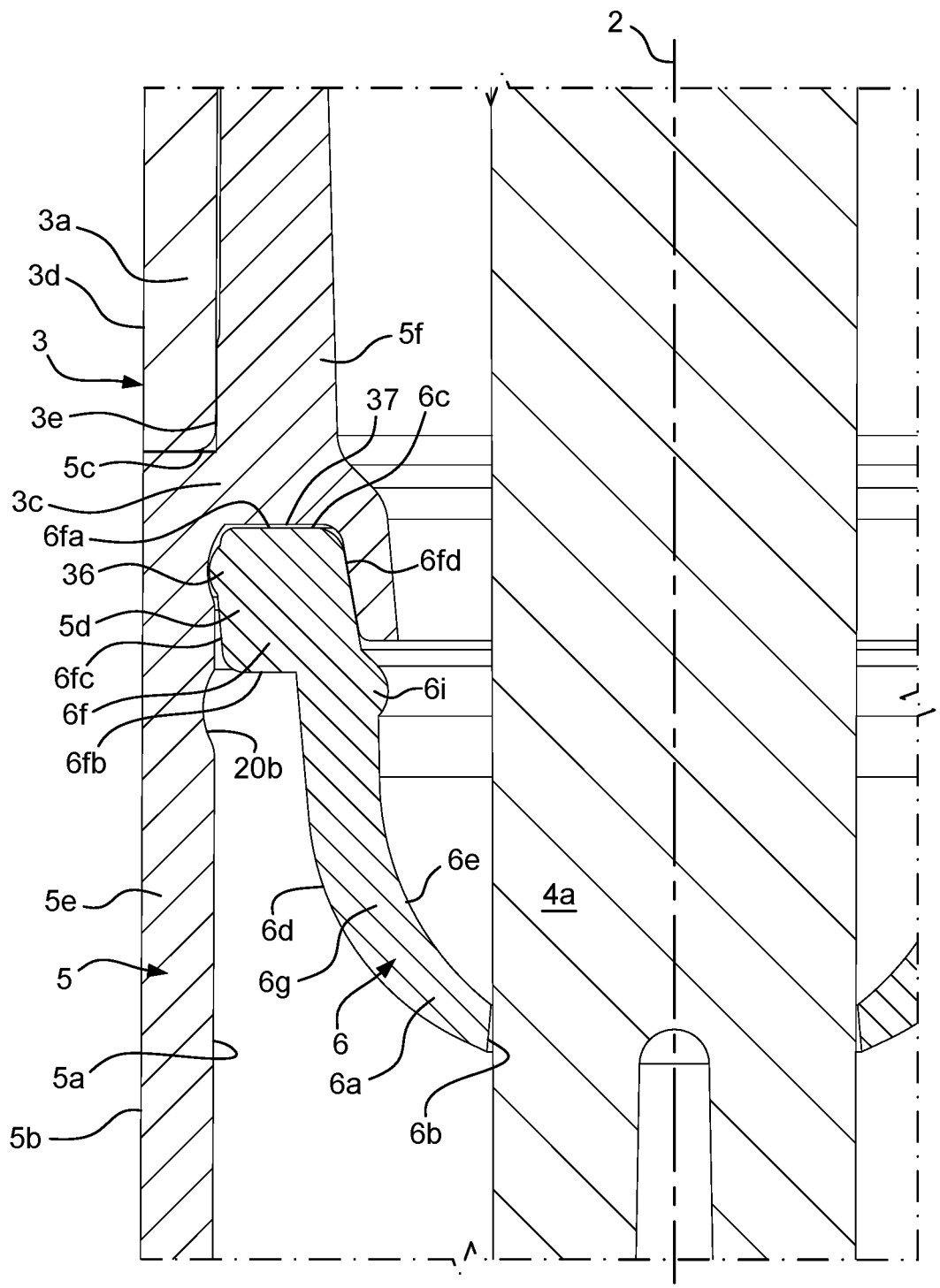
FIG. 24 is an axial cross-sectional view, on a larger scale, of FIG. 23.

Referring to FIGS. 23 and 24 which show the sub-assembly 3+4+5+6 before permanent fixed rigid combination with the reservoir 7 filled with contents C, the transverse proximal edge 6fa of the flange 6f of the squeegee 6 is adjacent to the inner shoulder 5c. The peripheral edge of larger diameter 6fc of the flange 6f is in peripheral contact with the face of smaller diameter 5a of the casing 5 towards the step 5c. In this peripheral contact zone, the peripheral edge of larger diameter 6fc of the flange 6f and the inner face of smaller diameter 5a of the casing 5 form a boss/recess combination 36, in the vicinity of the inner shoulder 5c, the boss being formed on the peripheral edge of larger diameter 6fc and the recess being formed on the inner face of smaller diameter 5a. Such an arrangement is provided in all the embodiments shown (FIGS. 4, 6, 9, 13, 21, 22, 23 and 24). The term "adjacent" is to be understood as meaning immediately next to. Thus, the recess of the boss/recess combination 36, adjacent to the inner shoulder 5c and inside the groove 5d when one is provided, and, separated in the distal direction, the recess of the boss/recess combination 20 are formed on the inner face of smaller diameter 5a of the distal portion 5e.

As can be seen in FIG. 24, the transverse proximal edge 6fa of the flange 6f of the squeegee 6 is slightly separated, with a small axial clearance 37, from the inner shoulder 5c. The flange 6f and the squeegee 6 thus do not bear axially on the inner shoulder 5c.

When, in the embodiments shown in FIGS. 9, 13, 21 and 22, 23 and 24, wherein the step 5c comprises a return so as to form an annular groove 5d open in the distal direction, the flange 6f of the squeegee 6 is housed in the groove 5d and is in contact, by its two peripheral edges of larger diameter and smaller diameter 6fd, respectively, with the face of the recess of the groove 5d in two peripheral zones facing one another.

Reference is made to FIG. 19, which shows the finished container/applicator 1, when the reservoir 7 filled with contents C has been rigidly combined with the sub-assembly 3+4+5+6, the proximal free edge 11c of reservoir 7 is adjacent to the transverse distal free edge 6fb of flange 6f, with axial clearance 34.

In addition, the proximal end 11b of the reservoir 7 is housed completely in the distal portion 5e of the casing 5 which it complements by its face of smaller diameter 5a, while the distal portion 6g of the squeegee 6 and the proximal end 11b of the reservoir 7 are in peripheral contact, between the face of larger diameter of the distal portion 6g of the squeegee 6 and the face of smaller diameter of the proximal end 11b of the reservoir 7.

The squeegee 6 is arranged in a fixed position in the casing 5, with its proximal edge 6c axially separated from the proximal end 8b of the casing 5.

With the structural arrangements thus described, the means 35 for permanent fixed rigid combination of the squeegee 6 with the reservoir 7 and the casing 5 are radial clamping, by axial pushing, of the squeegee 6 on the proximal end 11b of the reservoir 7 and on the casing 5, corresponding to the previously described contacts.

With these structural arrangements, the means 36 for temporary fixed rigid combination of the squeegee 6 and the casing 5 are in the form of the previously described boss/recess combination 36.

The sealing means 14 include peripheral radial clamping, sealing the squeegee 6 on the proximal end 11b of the reservoir 7 and on the casing 5, as well as radial clamping, sealing the cap/applicator/rod 3-4 on the proximal end 8b of the casing 5 by axial pushing when closing the container/applicator 1. This latter sealing radial clamping is provided between the face of larger diameter 26a of the flange 26 of the cap/applicator/rod 3-4 and the face of smaller diameter 5a of the proximal end 8b of the casing 5, so that the neck 26 enters the casing 5.

In addition, when, in the embodiments of FIGS. 9, 13, 21 and 22, 23 and 24, the step 5c includes a return so as to form the groove 5d, the sealing means 14 comprise peripheral radial clamping, sealing the flange 6f of the squeegee 6 with the face of the recess of the groove 5d, specifically in two peripheral zones facing one another.

In the case of a pair of zones of faces with peripheral radial clamping for holding or sealing, at least one of the two zones of the pair has a small taper for sealing peripheral radial clamping following axial pushing during manufacture.

With the described structural arrangement, the sealing means 14 and the means 12 for combining the cap 3 and the casing 5 are partially in common.

FIGS. 9 to 16 show the flexibility with no significant additional cost that the invention allows. Indeed, it makes it possible to produce a range of container/applicators 1 which, when closed with their cap 3, have a given overall external length, a given overall external diameter, but a capacity chosen from a range of capacities, all using a single type of cap 3 and a single type of casing 5, only the applicator/rod 4, or at least its rod 4a, the squeegee 6 and the reservoir 7 having sizes that correspond to the capacity. Thus, the two container/applicators 1 of FIGS. 9 to 12, as well as of FIGS. 13-16, have a given overall external length, in this case 81.8 mm, and a given overall external diameter, in this case 14.7 mm. The given dimensions and capacities are only illustrative and not limiting. The container/applicator 1 of FIGS. 9 to 12 has a capacity of 1 ml, while that of FIGS. 13 to 16 has a capacity of 2 ml. The two container/applicators 1 have the same single type of cap 3, both in terms of its structure and its dimensions, in particular an overall length of 31.73 mm and the same single type of casing 5, both as regards its structure and its dimensions, in particular an overall length of 65 mm. But, the two container/applicators 1 differ from one another by the applicator/rod assemblies 4, the squeegees 6 and the reservoirs 7, which are of suitable sizes, corresponding to the capacity. Therefore:

The rod 4a of FIGS. 9 to 12 has a smaller diameter than the rod 4a of FIGS. 13 to 16: 3 mm and 5 mm, respectively.

The applicator 4b of FIGS. 9 to 12 has a smaller diameter than the applicator 4b of FIGS. 13 to 16.

The opening of the squeegee of the distal edge 6b of FIGS. 9 to 12 has a smaller diameter than that of FIGS. 13 to 16: 3.05 mm and 5.07 mm, respectively (FIGS. 9, 11, 13 and 15).

The reservoir 7 of FIGS. 9 to 12 has smaller capacity than the reservoir 7 of FIGS. 13 to 16. The diameter of the face of smaller diameter 9a of the reservoir 7 of FIGS. 9 to 12 is smaller than that of the reservoir 7 of FIGS. 13 to 16, the thickness of the wall 9 of FIGS. 9 to 12 being greater than that of the wall 9 of FIGS. 13 to 16. For this purpose, the face of smaller diameter 9a of the reservoir 7 of FIGS. 9 to 12 comprises a portion 28 in which the diameter of the face of smaller diameter is reduced over a substantial portion of the axial length thereof adjacent to the bottom 15 of the reservoir 7, and a frustoconical portion 29 extending the portion 28 until the proximal end 11b of the reservoir 7.

The method for manufacturing a container/applicator 1 according to the invention, in the assembled state, closed and filled with contents C, is described below.

This manufacturing method starts with the five parts that are the cap 3, the applicator/rod 4, the casing 5, the squeegee 6 and the reservoir 7, each of these parts having been manufactured beforehand.

In the method, a unitary sub-assembly 3+4+5+6 is provided, comprising the cap 3, the applicator/rod 4, the casing 5 and the squeegee 6, but not the reservoir 7.

A reservoir 7 for receiving contents, empty of contents, is provided separately.

The unitary sub-assembly 3+4+5+6 and the reservoir 7 have the previously described features. It should be understood from this that the unitary sub-assembly 3+4+5+6 and the reservoir 7 are configured so that they can be assembled in a fixed rigid manner by being interlocked and nested.

Finally, contents C are provided separately.

Then, the reservoir 7 is filled with the contents C via the opening of its proximal end 11b.

Then, the unitary sub-assembly 3+4+5+6 and the reservoir 7 thus filled with contents C are interlocked, nested and combined together in a fixed rigid manner by insertion and then axial sliding, so as to obtain the container/applicator 1 in the assembled state, closed and filled with contents C. Given that the reservoir 7 is then filled with contents C, the operations for interlocking, nesting and fixed rigid combination by insertion and axial sliding are carried out with the axis 2 vertical or substantially vertical and the opening of the proximal end 11b of the reservoir 7 facing the top to prevent the reservoir 7 from spilling its contents C.

In order to provide the unitary cap/applicator/rod/squeegee/casing sub-assembly 3+4+5+6, a cap 3 and a applicator/rod 4, a casing 5 and a squeegee 6 are provided separately, and then interlocked, nested and combined in a fixed rigid manner by axial sliding and axial pushing in order to combine the cap 3, the applicator/rod 4, the casing 5 and the squeegee 6, so as to obtain the unitary cap/applicator/rod/squeegee/casing sub-assembly 3+4+5+6. It should be understood from this that the cap 3 and the applicator/rod 4 are interlocked, nested and combined, that the squeegee 6 and the casing 5 are interlocked, nested and combined, and that the cap 3 and the applicator/rod 4 as well as the casing 5 and the squeegee 6 are interlocked, nested and combined.

In one embodiment, a cap 3, an applicator/rod 4, a casing 5 and a squeegee 6 are provided initially separated from one another and then interlocked, nested and combined in a fixed rigid manner, by axial sliding and axial pushing in a single common interlocking, nesting and combination operation.

With such an embodiment, and as shown by FIGS. 5a to 5e, the cap 3, the applicator/rod 4, the casing 5 and the squeegee 6 are positioned coaxially (typically with respect to a vertical axis) in series in the relative direction that each of them has in the unitary assembly 3+4+5+6; then, they are slid axially in a relative manner so as to perform the common interlocking, nesting and combination operation.

In another embodiment, several successive interlocking, nesting and combination operations are carried out so that the parts 3, 4, 5 and 6 that constitute the sub-assembly 3+4+5+6 are interlocked, nested and combined in a successive manner. With such an embodiment, one or more interlocking, nesting and combination operations can be provided for a sub-sub-assembly of the sub-assembly 3+4+5+6. For example, it is possible to make a cap 3+applicator/rod 4 sub-sub-assembly and a casing 5+squeegee 6 sub-sub-assembly, and then to perform an operation of interlocking, nesting and combining the cap 3+applicator/rod 4 sub-sub-assembly and the casing 5+squeegee 6 sub-sub-assembly.

As regards interlocking, nesting and combining the squeegee 6 and the casing 5, the squeegee 6 is inserted, starting with its proximal edge 6c, into the casing 5, through the opening 8aa of its distal end 8a, and guided to slide axially into the casing 5 in the proximal direction until it is held combined with the casing 5 in a temporary fixed rigid manner until the reservoir 7 is mounted, by engagement of the boss and the recess and production of the means 36 for temporary fixed rigid combination of the squeegee 6 and the casing 5. To this end, the squeegee 6 can be mounted on a mandrel mounted to slide axially relative to a support for the casing 5 and thus relative to the casing 5 itself. The insertion and sliding movements are understood to be relative between the squeegee 6 and the casing 5.

Thus, the sub-assembly 3+4+5+6 is manufactured as such a unitary sub-assembly. Once manufactured in this way, it can be stored, transported, handled and finally used as such for the manufacture of the container/applicator 1. Indeed, the means 36 for temporary fixed rigid combination of the squeegee 6 and the casing 5 are sufficient for ensuring that the squeegee 6 does not separate unexpectedly from the rest of the sub-assembly.

As regards interlocking, nesting and combining the reservoir 7 filled with contents C and the unitary sub-assembly 3+4+5+6, the reservoir 7 is inserted, starting with its proximal edge 11c, into the casing 5, guided to slide axially into the casing 5 in the proximal direction until it comes to rest on the squeegee 6 and reciprocal axial pushing for rigid combination is provided. As above, the insertion and sliding movements are understood to be relative between the reservoir 7 filled with contents C and the unitary sub-assembly 3+4+5+6.

With the method that was just described, in which the unitary sub-assembly 3+4+5+6 and the reservoir 7 thus filled with contents C are interlocked, nested and combined in a fixed rigid manner by insertion followed by axial sliding, in order to obtain the container/applicator 1, it is possible for the unitary sub-assembly 3+4+5+6 and the empty container 7 of contents C to be provided at one or more plastic-processing sites, and then for the unitary sub-assembly 3+4+5+6 and the reservoir 7 empty of contents to be transported to a packaging site that can be remote from the plastic-processing site or sites. Then, at the packaging site, the reservoir 7 is filled with the contents C and the unitary sub-assembly 3+4+5+6 and the reservoir 7 filled with contents C are interlocked, nested and combined in a fixed rigid manner. Such a manufacturing process offers many advantages in terms of flexibility, logistics and preservation of integrity, as well as site organisation and specialisation.

The method for manufacturing the container/applicator 1 starts with its five distinct constituent parts 3, 4, 5, 6 and 7, which were manufactured beforehand by means of a manufacturing tool using plastic injection moulding. Considering the structure given to the five distinct constituent parts 3, 4, 5, 6 and 7, and in particular the absence of screwing/unscrewing threads, this manufacturing tool using plastic injection moulding is such that at least one and in particular all of the moulds for manufacturing the cap 3, applicator/rod 4 or at least 4*a* rod, casing 5, squeegee 6 and reservoir 7 are moulds without slides. This feature is advantageous in terms of cost, simplicity, speed and efficiency.

Considering the structure given to the five distinct constituent parts 3, 4, 5, 6 and 7, it is also possible to achieve, in an easy, quick and economical way, including for short runs, a range of container/applicators 1 having a given overall external length, a given overall external diameter, and a capacity chosen from a range of capacities, as previously described, by means of a manufacturing tool comprising a single mould for manufacturing a cap 3, a single mould for manufacturing an applicator/rod 4, or at least a rod 4*a*, a single mould for manufacturing a casing 5, a single mould for manufacturing a squeegee 6, a single mould for manufacturing a reservoir 7, a range of pins, inserts or the like, capable of engaging with the single mould for manufacturing the applicator/rod 4, or at least the rod 4*a*, so as to be able to manufacture, using said mould, applicator/rod assemblies 4, or at least rods 4*a*, of a range of sizes (shape, diameter, length) corresponding to the range of capacities of the container/applicators 1 and to the application function, a range of pins, inserts or the like, capable of engaging with the single mould for manufacturing a squeegee, so as to be able to manufacture, using said mould, squeegees 6 of a range of sizes corresponding to the range of applicator/rods 4, a range of pins, inserts or the like, capable of engaging with the single mould for manufacturing a reservoir 7, so as to be able to manufacture, using said mould, reservoirs 7 of a range of sizes corresponding to the range of capacities of the container/applicators 1.

The manufacturing of such a part 4 or 4*a*, 6, 7 then comprises a step of combining a pin, an insert or the like with the mould in question.

The invention offers great modularity in order to be able to provide features suited to each product, using the same basic tools, such as different rod diameters (for example from 2 mm to 6 mm) with the same cap 3, different rod lengths, different squeegee diameters (for example from 2 mm to 6 mm), different squeegee hardnesses (for example from 40 Shore A to 70 Shore D), reservoir capacities 7 suited to each product (for example from 1 ml to 6 ml for a sample and from 4 ml to 20 ml for products other than samples).

The invention also offers great compatibility with a wide variety of applicators (brush, wand, soft tip, etc.). And in the absence of threading, a squeegee with a large wide opening can be contemplated, thus allowing the use of large applicators (flat, cylindrical, conical).

The invention is ideal for samples but it is also profitable for other products intended to be sold.

The invention claimed is:

1. A container/applicator in an assembled state in which the container/applicator is closed and filled with contents, the container/applicator having a generally elongate cylindrical shape along a central longitudinal axis thereof, the container/applicator comprising:
   a reservoir configured to receive the contents, the reservoir having a peripheral axial wall, a distal end closed by a bottom, and an open proximal end with a proximal free edge;
   a unitary cap/applicator/rod formed by a removable closure cap and an applicator/rod, the removable closure cap, having a peripheral axial skirt and a top wall;
   a casing formed by a peripheral axial wall, the casing having an open distal end and an open proximal end, the reservoir and the casing having a common axial length of the reservoir and the casing;
   an annular squeegee having an open distal edge forming a smaller opening and an open proximal edge forming a larger opening; and
   an interface comprising
      a first fixed rigid combination system configured to combine the reservoir and the casing,
      a removable rigid combination system configured to combine the cap/applicator/rod and a remaining portion of the container/applicator, and
      a seal,
   wherein the squeegee is a part separate from the casing and is housed completely in the casing,
   the squeegee has a proximal portion that is a centrifugal protruding flange and a distal portion that is one of a truncated cone and a spherical segment,
   the squeegee is held by a second fixed rigid combination system configured to combine the squeegee with the reservoir and the casing,
   the casing has a transverse step forming an inner shoulder,
   the configuration of the casing is configured so that, during manufacture of the container/applicator, the squeegee is configured to be inserted, with the open proximal edge, into the open distal end of the casing, guided to slide axially into the casing in a proximal direction, and the reservoir filled with the contents is configured to be inserted, with a proximal edge of the reservoir, into the open distal end of the casing and guided to slide axially into the casing in the proximal direction,
   a proximal edge of the centrifugal protruding flange of the squeegee is adjacent to the inner shoulder,
   the proximal free edge of the reservoir is adjacent to a distal edge of the centrifugal protruding flange,
   the centrifugal protruding flange is in peripheral contact with an inner face of smaller diameter of the casing,
   the proximal end of the reservoir is housed completely in the casing and matches the inner face of smaller diameter of the casing, and
   the distal portion of the squeegee and the proximal end of the reservoir are in peripheral contact.

2. The container/applicator according to claim 1, wherein the squeegee is flexible.

3. The container/applicator according to claim 1, wherein the second fixed rigid combination system configured to combine the squeegee with the reservoir and the casing radially clamps with axial pushing the squeegee on the proximal end of the reservoir and on the casing.

4. The container/applicator according to claim 1, further comprising a temporary fixed rigid combination system configured to combine the squeegee and the casing when, during manufacture, the reservoir is not yet combined in a fixed rigid manner with and inside the casing the temporary fixed rigid combination system comprising a boss/recess combination of the peripheral face of the flange of the squeegee and of the inner face of the casing, in the vicinity of the inner shoulder.

5. The container/applicator according to claim 1, wherein the step comprises an inner return directed axially in the distal direction, to form an annular groove open in the distal direction in which the flange of the squeegee is housed.

6. The container/applicator according to claim 1, wherein the casing has two parts extending axially, joined by the step:
- an outer distal portion having a larger diameter in which the flange, the distal portion of the squeegee, and at least the proximal portion of the reservoir are housed, and
- an inner proximal portion having a smaller diameter housed in the cap.

7. The container/applicator according to claim 6, wherein the first fixed rigid combination system configured to combine the reservoir and the casing comprises radial clamping, with axial pushing, of mated surfaces in contact with a face of larger diameter of the reservoir and the inner face of smaller diameter of the distal portion of the casing at the distal portion.

8. The container/applicator according to claim 7, wherein the first fixed rigid combination system comprises, on a proximal portion with clamping of the common axial length of the reservoir and the casing adjacent to the proximal edge of the reservoir and the shoulder of the casing, radial clamping, by axial pushing, of mated surfaces in contact with the face of larger diameter of the reservoir and the inner face of the casing at the distal portion, and
wherein the walls of the reservoir and the casing have a clearance taper so that the face of larger diameter of the reservoir and the inner face of the casing have a radial clearance between them the face of larger diameter of the reservoir and the inner face on a distal portion with clearance of the common axial length of the reservoir and the casing, the common axial length comprising the proximal portion with clamping and the distal portion with clearance.

9. The container/applicator according to claim 7, wherein the first fixed rigid combination system comprises, over substantially the entire common axial length of the reservoir and the casing, radial clamping, with axial pushing, of mating surfaces in contact with the face of larger diameter of the reservoir and the inner face of the distal portion of the casing.

10. The container/applicator according to claim 1, wherein the cap and the applicator/rod are two separate parts, and the applicator/rod is configured to be a fixed rigid assembly of a plurality of components, with a third fixed rigid combination system configured to combine the cap and the applicator/rod comprising a portion for fixed rigid combination of the applicator/rod with the peripheral axial skirt of the cap, by axial pushing, to form the cap/applicator/rod unit.

11. The container/applicator according to claim 1, wherein the seal includes peripheral radial clamping, sealing the squeegee on the proximal end of the reservoir and on the casing.

12. The container/applicator according to claim 11, wherein the seal includes peripheral radial clamping, sealing the squeegee with the inner face of the casing, and the distal portion of the squeegee with the face of smaller diameter of the proximal end of the reservoir.

13. The container/applicator according to claim 12, wherein the seal includes peripheral radial clamping, sealing the flange of the squeegee with a face of the recess of the groove of the step of the casing, in two peripheral zones facing one another.

14. The container/applicator according to claim 11, wherein the seal further comprises radial clamping, sealing the cap/applicator/rod on the proximal end of the casing, by axial pushing when closing the container/applicator.

15. The container/applicator according to claim 14, wherein the radial clamping sealing the cap/applicator/rod and the proximal end of the casing is provided between the face of larger diameter of a neck of the applicator/rod and the face of smaller diameter of the proximal end of the casing, so that the neck enters the casing.

16. The container/applicator according to claim 1, wherein, in a pair of areas of a face of a squeegee, the reservoir or the casing, with sealing peripheral radial clamping, at least one of the two areas having a taper to seal peripheral radial clamping following axial pushing during manufacture.

17. The container/applicator according to claim 1, wherein there is radial clearance between the rod of the applicator/rod and the open distal edge of the squeegee.

18. The container/applicator according to claim 1, wherein the bottom of the reservoir is coplanar relative to a distal edge of the casing, so that the bottom closes the distal opening of the casing, the common axial length of the reservoir and the casing matching the axial length of the reservoir and the axial length of the distal portion of the casing.

19. The container/applicator according to claim 1, wherein the bottom of the reservoir is positioned below the distal edge of the casing, so that the casing protrudes axially beyond the reservoir in the distal direction, the common axial length of the reservoir and the casing matching the axial length of the reservoir and being shorter than the axial length of the distal portion of the casing.

20. The container/applicator according to claim 1, wherein the bottom of the reservoir is positioned beyond the distal edge of the casing, so that the reservoir protrudes axially beyond the casing in the distal direction, the common axial length of the reservoir and the casing being shorter than the axial length of the reservoir and matching the axial length of the distal portion of the casing.

21. The container/applicator according to claim 1, wherein the reservoir comprises a single peripheral wall that bounds a space that receives the contents and is part of the first fixed rigid combination system configured to combine the reservoir and the casing.

22. The container/applicator according to claim 1, wherein the reservoir comprises, combined in a fixed rigid manner:
- a first peripheral axial wall of smaller diameter with which the bottom is combined, the first peripheral axial wall bounding the space that receives the contents,
- a second peripheral axial wall of larger diameter, the second peripheral axial wall being part of the first fixed rigid combination system configured to secure the reservoir with the casing,
- a third peripheral axial wall configured to connect the first peripheral axial wall of smaller diameter and the second peripheral axial wall of larger diameter, arranged radially facing one another and combined together in a fixed rigid manner.

23. The container/applicator according to claim 1, wherein an effective capacity for the contents of the container is between 1 ml and 20 ml, the external diameter is between 10 mm and 35 mm, and the axial length of the reservoir is between 40 mm and 150 mm.

24. A unitary cap/applicator/rod/squeegee/casing sub-assembly configured to form an assembled container/applicator that is closed and filled with contents, when assembled in a fixed rigid manner with a reservoir filled with the contents by an interface configured to provide a fixed rigid combination and a seal, said sub-assembly having a generally elongate cylindrical shape along a central longitudinal axis thereof and being configured to be interlocked and nested with the reservoir, the sub-assembly comprising:
  a unitary cap/applicator/rod formed by a cap and an applicator/rod, the cap having a peripheral axial skirt and a top wall;
  a casing having a peripheral axial wall, an open distal end, an open proximal end, and a transverse step towards the central longitudinal axis forming an inner shoulder;
  an annular squeegee having an open distal edge forming a smaller opening and an open proximal edge forming a larger opening than the smaller opening, the annular squeegee being a part separate from the casing and housed completely in the casing, the annular squeegee having a proximal portion that is a centrifugally protruding flange and a distal portion that is one of a truncated cone and a spherical segment, a proximal edge of the centrifugally protruding flange being adjacent to the inner shoulder, the centrifugally protruding flange being in peripheral contact with an inner face of the casing; and
  an interface comprising
    a removable rigid combination system configured to combine the cap/applicator/rod and the casing,
    a temporary fixed rigid combination system configured to combine the squeegee and the casing, and
    a seal,
  wherein the unitary sub-assembly is configured to be stored, transported, handled, and assembled with said reservoir filled with the contents to obtain the container/applicator in the assembled state, closed and filled with the contents, and
  wherein, during manufacture, the casing is configured to receive the squeegee with a proximal edge into the open distal end of the casing, the proximal edge guided to slide axially into the casing in a proximal direction, the reservoir being configured to be inserted into the open distal end of the casing and guided to slide axially into the casing in the proximal direction.

25. A method for manufacturing a container/applicator in an assembled state in which the container/applicator is closed and filled with contents, the method comprising:
  separately providing
    a unitary cap/applicator/rod/squeegee/casing sub-assembly configured to form the assembled container/applicator that is closed and filled with the contents, when assembled in the fixed rigid manner with the reservoir filled with the contents, by the interface configured to provide the fixed rigid combination and the seal, said sub-assembly having a generally elongate cylindrical shape along its axis and being configured to be interlocked and nested with the reservoir, the sub-assembly including
      a unitary cap/applicator/rod formed by a cap and an applicator/rod, the cap having a peripheral axial skirt and a top wall;
      a casing having a peripheral axial wall, an open distal end, an open proximal end, and a transverse step towards the central longitudinal axis forming an inner shoulder,
      an annular squeegee having an open distal edge forming a smaller opening and an open proximal edge forming a larger opening than the smaller opening, the annular squeegee being a part separate from the casing and housed completely in the casing, the annular squeegee having a proximal portion that is a centrifugally protruding flange and a distal portion that is one of a truncated cone and a spherical segment, a proximal edge of the centrifugally protruding flange being adjacent to the inner shoulder, the centrifugally protruding flange being in peripheral contact with an inner face of the casing, and
      an interface comprising
        a removable rigid combination system configured to combine the cap/applicator/rod and the casing,
        a temporary fixed rigid combination system configured to combine the squeegee and the casing, and
        a seal,
      the reservoir configured to receive the contents, empty of contents, the reservoir having a peripheral axial wall, a distal end closed by a bottom, and an open proximal end with a proximal edge, and
      contents,
    the unitary sub-assembly being configured to be stored, transported, handled, and assembled with said reservoir filled with the contents to obtain a container/applicator in the assembled state, closed and filled with the contents,
  rigidly assembling the sub-assembly and the reservoir by being interlocked and nested;
  filling the reservoir with the contents via the opening of the proximal end of the reservoir after rigidly assembling the sub-assembly and the reservoir; and
  interlocking, nesting, and combining the sub-assembly and the reservoir filled with the contents in a fixed rigid manner by sliding axially, to obtain the container/applicator in the assembled state, closed and filled with the contents,
  wherein, during manufacture, the casing is configured to receive the squeegee with a proximal edge into the open distal end of the casing, the proximal edge guided to slide axially into the casing in a proximal direction, the reservoir being configured to be inserted into the open distal end of the casing and guided to slide axially into the casing in the proximal direction.

26. The method according to claim 25, further comprising:
  separately providing the cap, the applicator/rod, the casing, and the squeegee; and
  interlocking, nesting, and combining the cap, the applicator/rod, the casing, and the squeegee in a fixed rigid manner by axial sliding and axial combination pushing to obtain the unitary sub-assembly, the cap and the applicator/rod being interlocked, nested, and combined, the squeegee and the casing being interlocked, nested, and combined, and the cap, the applicator/rod, the casing, and the squeegee being interlocked, nested, and combined.

27. The method according to claim 25, wherein the unitary cap/applicator/rod/squeegee/casing sub-assembly and the reservoir empty of the contents are provided at one or more plastic-processing sites, and the method further comprises transporting the unitary cap/applicator/rod/squeegee/casing unit sub-assembly and the reservoir are transported, empty of the contents, to a packaging site remote from the one or more plastic-processing sites;

filling the reservoir with the contents at the packaging site; and rigidly interlocking, nesting, and combining the unitary cap/applicator/rod/squeegee/casing sub-assembly in a fixed rigid manner with the reservoir filled with the contents.

28. A tool for manufacturing by plastic injection molding, the tool being configured to implement the manufacturing method according to claim 25, wherein at least one mold of a first mold to manufacture the cap, a second mold to manufacture the applicator/rod or at least a rod, a third mold to manufacture the casing, a fourth mold to manufacture the squeegee, and a fifth mold to manufacture the reservoir is a mold without a slide.

* * * * *